(12) United States Patent
Oshiumi

(10) Patent No.: US 11,232,333 B2
(45) Date of Patent: Jan. 25, 2022

(54) MOBILE APPARATUS AND DISTRIBUTION-MATERIAL PROVIDING SYSTEM

(71) Applicant: FUJIFILM Business Innovation Corp., Tokyo (JP)

(72) Inventor: Makoto Oshiumi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 170 days.

(21) Appl. No.: 16/290,965

(22) Filed: Mar. 4, 2019

(65) Prior Publication Data

US 2019/0279055 A1 Sep. 12, 2019

(30) Foreign Application Priority Data

Mar. 12, 2018 (JP) .............................. JP2018-044534

(51) Int. Cl.
| | | |
|---|---|---|
| G06K 15/16 | (2006.01) | |
| G06K 15/02 | (2006.01) | |
| H04N 1/32 | (2006.01) | |
| G06F 9/30 | (2018.01) | |

(52) U.S. Cl.
CPC ......... *G06K 15/16* (2013.01); *G06F 9/30003* (2013.01); *G06K 15/1801* (2013.01); *H04N 1/32267* (2013.01)

(58) Field of Classification Search
CPC ....................................................... G06K 15/16
USPC ......................................................... 358/1.15
See application file for complete search history.

(56) References Cited

U.S. PATENT DOCUMENTS

| | | | |
|---|---|---|---|
| 9,992,632 B2 | 6/2018 | Fujimoto et al. | |
| 2014/0309835 A1* | 10/2014 | Yamamoto | G05D 1/0274 701/25 |
| 2015/0378652 A1* | 12/2015 | Sakurai | H04N 1/00204 358/1.15 |
| 2016/0274840 A1* | 9/2016 | Bannai | G06F 21/608 |
| 2018/0069935 A1* | 3/2018 | Miyazaki | H04N 1/4406 |

FOREIGN PATENT DOCUMENTS

| | | |
|---|---|---|
| JP | 2011-097206 | 5/2011 |
| JP | 2016-203562 | 12/2016 |
| JP | 2017199168 | 11/2017 |

* cited by examiner

*Primary Examiner* — Jacky X Zheng
(74) *Attorney, Agent, or Firm* — JCIPRNET

(57) ABSTRACT

A mobile apparatus includes a group setting section and a providing section. The group setting section sets one or more groups each having multiple members. When the multiple members are connected by using one or more straight lines, all of the multiple members are positioned so as to be connected by one or more straight lines each equal to or shorter than a predetermined threshold. Each of the one or more straight lines connects one member of the plurality of members and one other member of the plurality of members. The providing section moves to any one member of each of the one or more groups and provides distribution material.

20 Claims, 34 Drawing Sheets

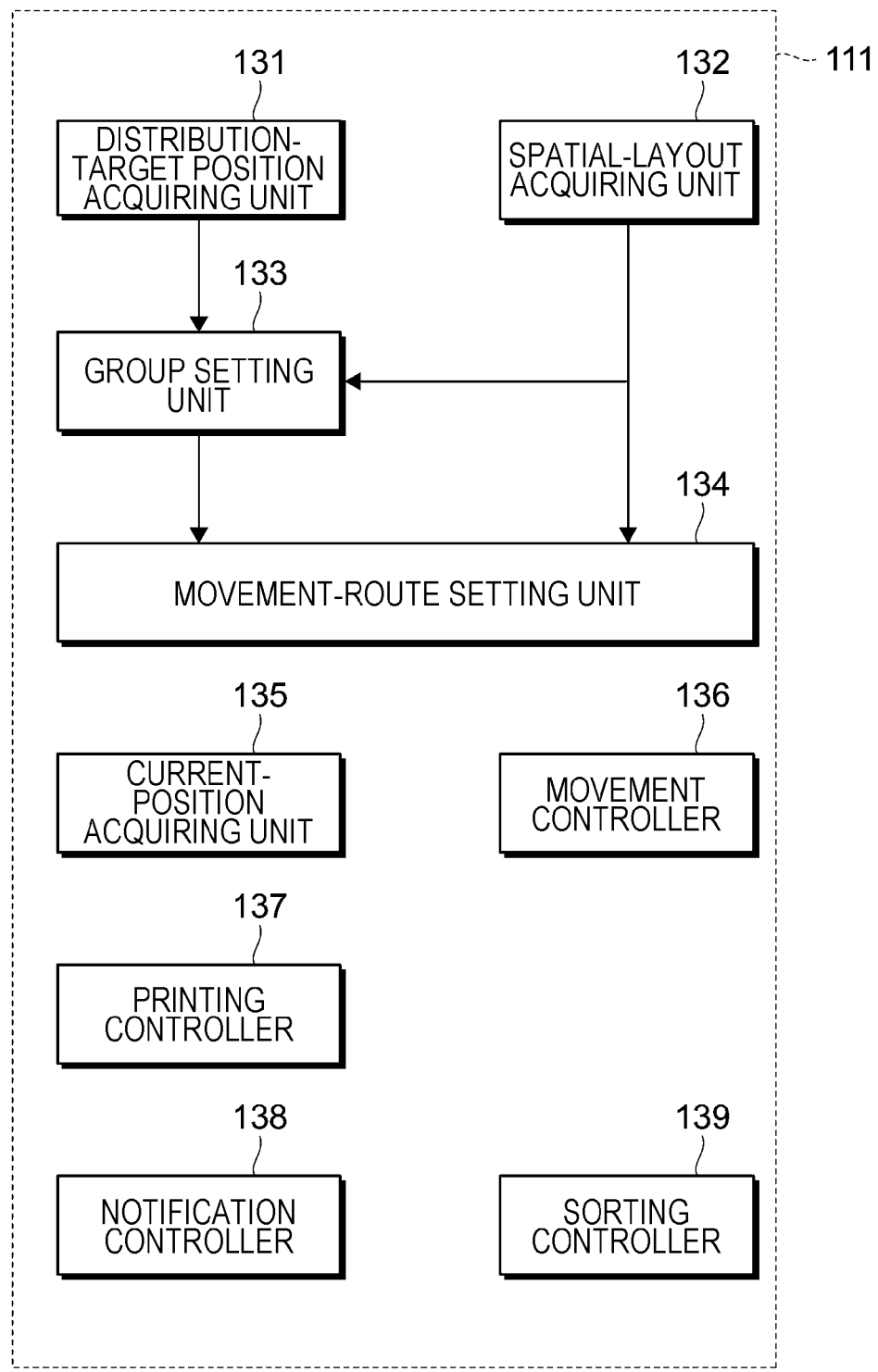

FIG. 6

| RULE FOR DIVISION INTO GROUPS | DESCRIPTION |
|---|---|
| DIVISION RULE 1 | EACH OF THE MEMBERS INCLUDED IN THE SAME GROUP IS POSITIONED SO AS TO BE CONNECTED TO ALL OF THE OTHER MEMBERS DIRECTLY OR INDIRECTLY THROUGH AT LEAST ONE LINE WHICH HAS A LENGTH OF THE PREDETERMINED REFERENCE DISTANCE OR SHORTER AND WHICH CONNECTS ONE MEMBER TO ANOTHER |
| DIVISION RULE 2 | EACH GROUP HAS A PREDETERMINED NUMBER OF MEMBERS OR FEWER (THE NUMBER OF PIECES OF DISTRIBUTION MATERIAL DISTRIBUTED IN EACH GROUP IS THE PREDETERMINED NUMBER OR LESS) (THE TIME REQUIRED FOR DISTRIBUTION IN A GROUP IS A PREDETERMINED TIME OR SHORTER) |
| DIVISION RULE 3 | THERE IS A ROUTE ALONG WHICH THE PRINTER MAY MOVE TO AT LEAST ONE PERSON IN EACH GROUP |

THE SAME GROUP

FIG. 9A
FIG. 9B
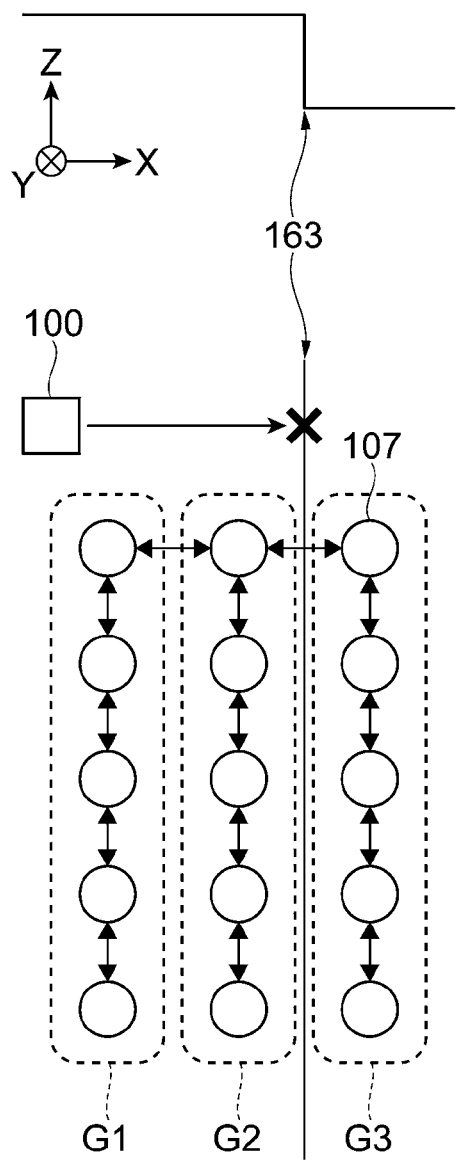
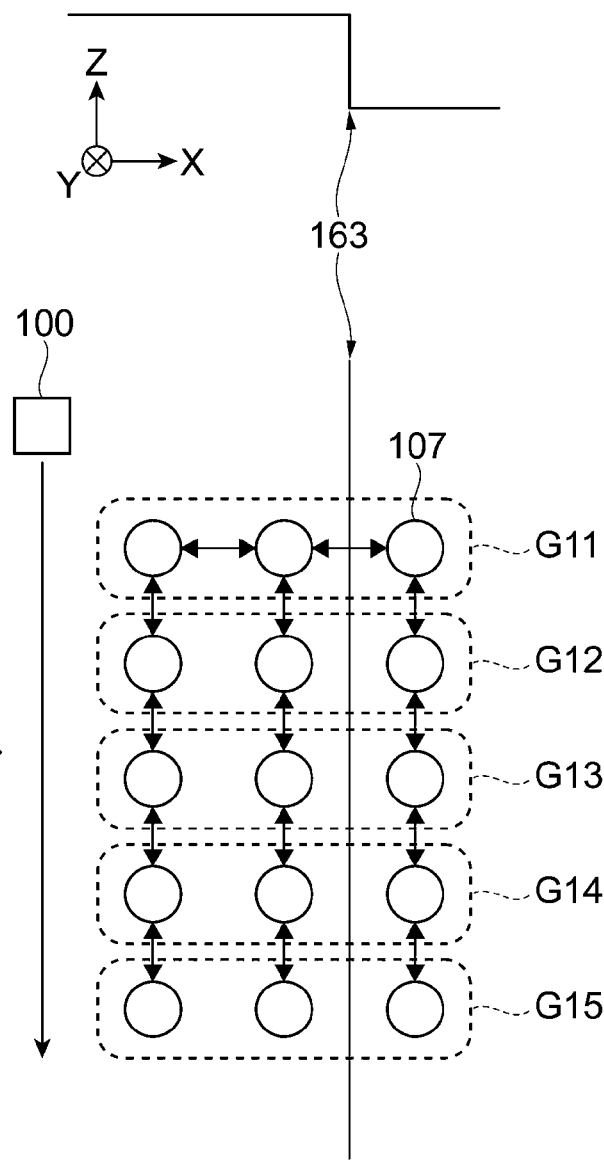
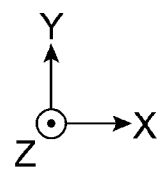
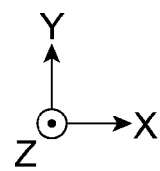
 THE SAME GROUP

FIG. 10

| RULE FOR SETTING ROUTE | DESCRIPTION |
|---|---|
| SETTING-ROUTE RULE 1 | THERE IS A ROUTE WHICH ALLOWS AN APPARATUS TO MOVE TO AT LEAST ONE MEMBER IN EACH GROUP |
| SETTING-ROUTE RULE 2 | THE DISTANCE OVER WHICH AN APPARATUS MOVES TO THE GROUPS ONE BY ONE IS SHORTER THAN OTHER CANDIDATES |
| SETTING-ROUTE RULE 3 | AN APPARATUS IS CAPABLE OF MOVING FIRST TO A GROUP HAVING THE LARGEST NUMBER OF MEMBERS |
| SETTING-ROUTE RULE 4 | AN APPARATUS IS CAPABLE OF MOVING LAST TO A GROUP HAVING THE SMALLEST NUMBER OF MEMBERS |

FIG. 11A
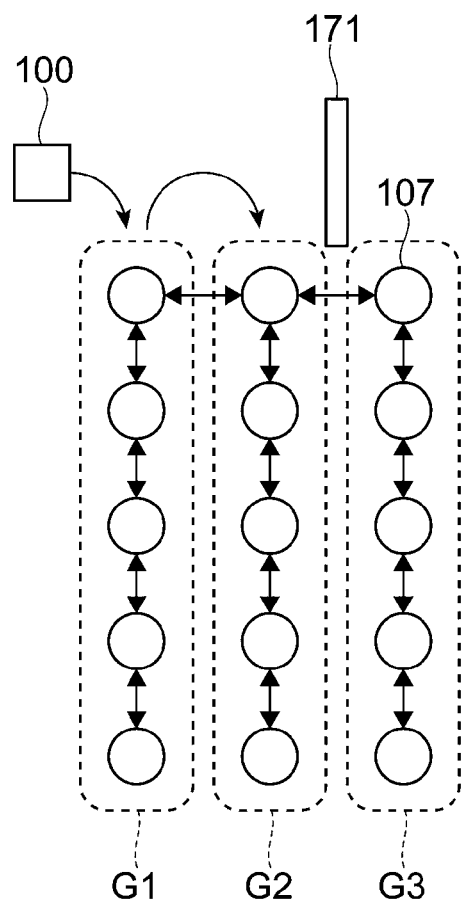
FIG. 11B
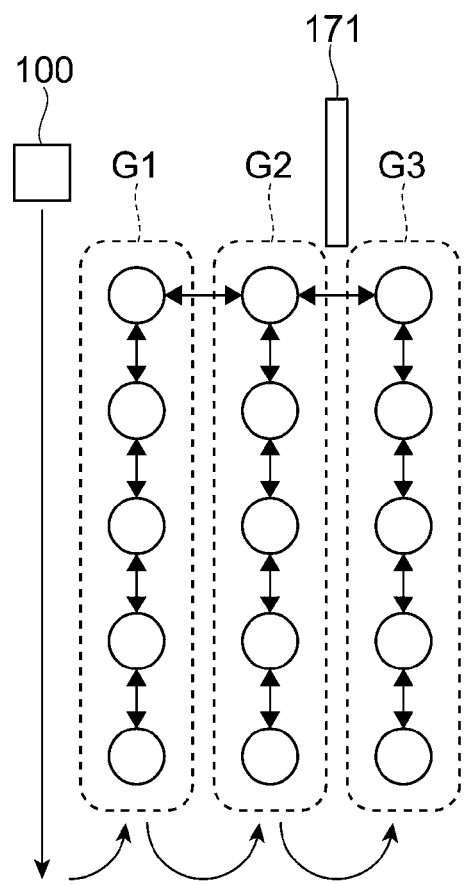
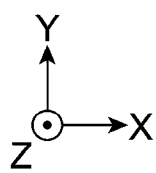
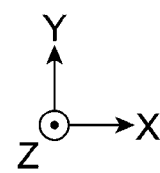
 THE SAME GROUP FIG. 12A
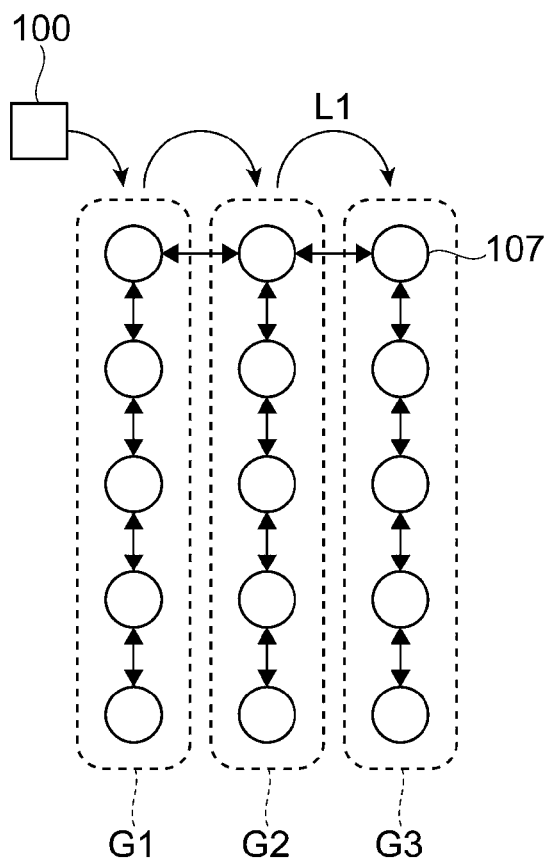
FIG. 12B
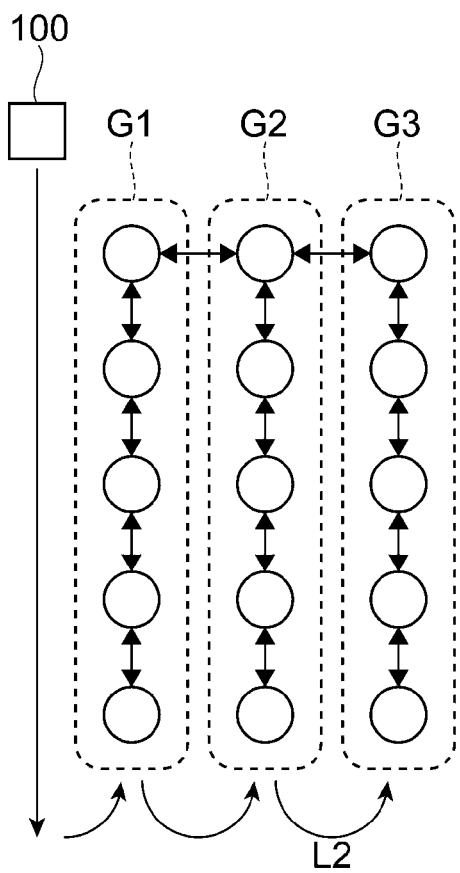
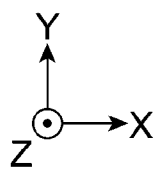
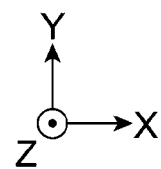
 THE SAME GROUP

◄-------- DISTRIBUTION-BY-HAND DIRECTION

◄——— ROUTE ALONG WHICH PRINTER MOVES

FIG. 20
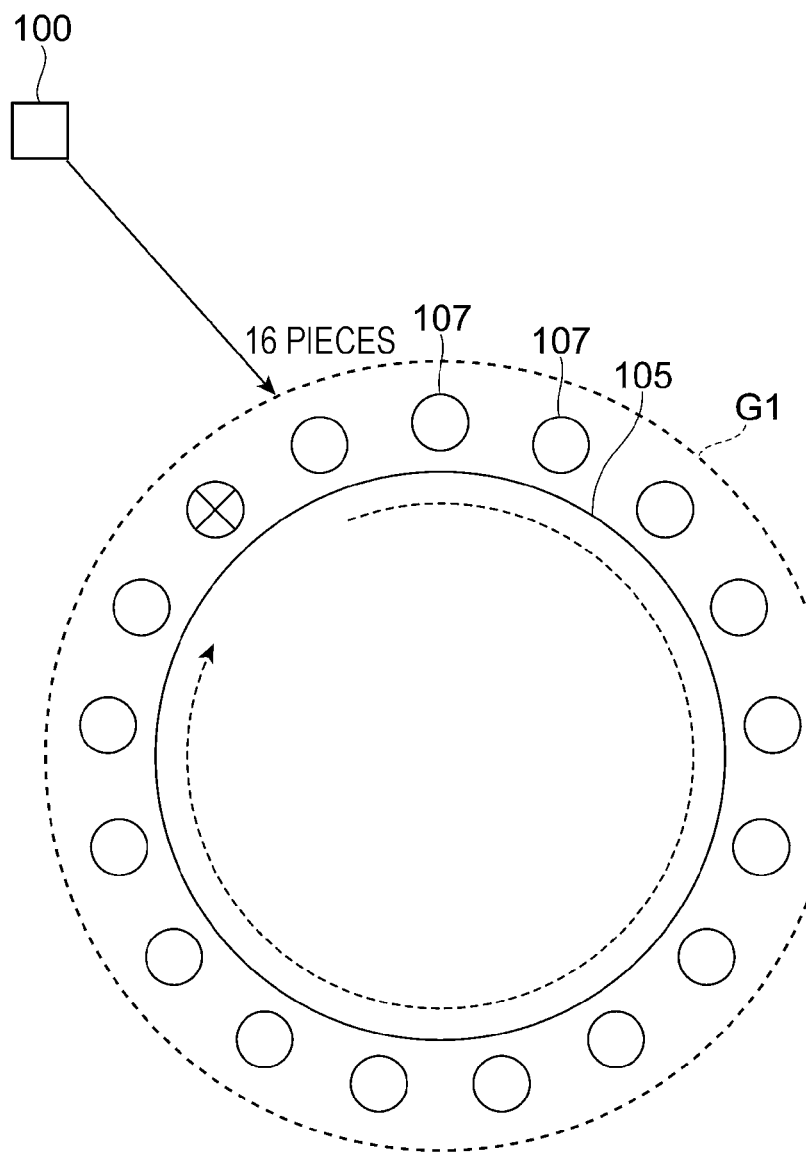
←------ DISTRIBUTION-BY-HAND DIRECTION
←——— ROUTE ALONG WHICH PRINTER MOVES
 VACANT SEAT

← - - - - - - DISTRIBUTION-BY-HAND DIRECTION

← ———— ROUTE ALONG WHICH PRINTER MOVES

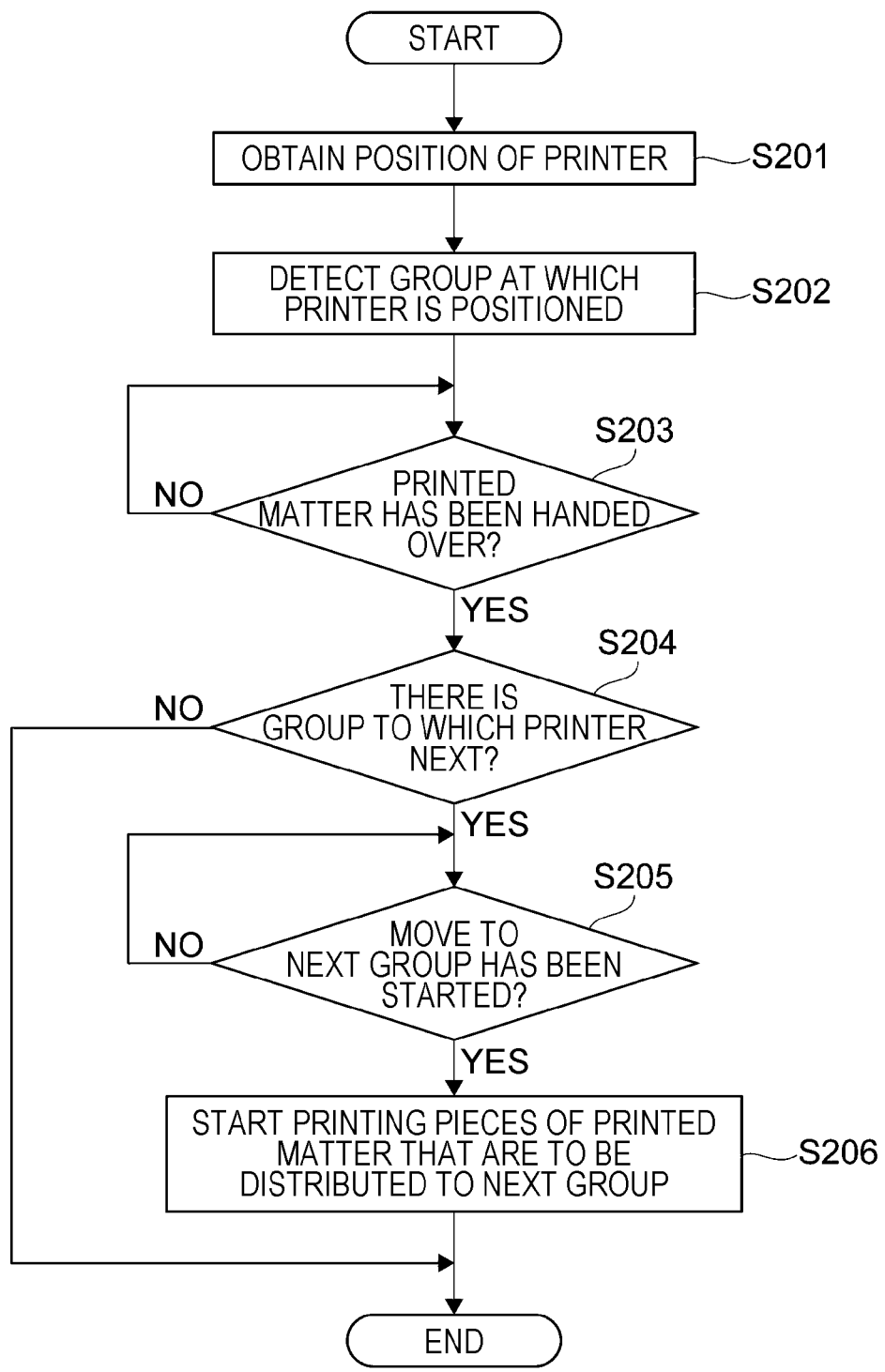

MOBILE APPARATUS AND DISTRIBUTION-MATERIAL PROVIDING SYSTEM

CROSS-REFERENCE TO RELATED APPLICATIONS

This application is based on and claims priority under 35 USC 119 from Japanese Patent Application No. 2018-044534 filed Mar. 12, 2018.

BACKGROUND (i) Technical Field

The present disclosure relates to a mobile apparatus and a distribution-material providing system.

(ii) Related Art

There is a self-propelled apparatus which moves to an individual who has requested provision of a service and which provides a printing service or another service for the individual.

SUMMARY

Aspects of non-limiting embodiments of the present disclosure relate to reduction in the time required to distribute distribution material that is distributed by a mobile apparatus individually to multiple persons. The time is reduced compared with the case in which the mobile apparatus moves to each of the persons and distributes the distribution material.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a mobile apparatus including a group setting section and a providing section. The group setting section sets one or more groups each having a plurality of members. When the plurality of members are connected by using one or more straight lines, all of the plurality of members are positioned so as to be connected by one or more straight lines each equal to or shorter than a predetermined threshold. Each of the one or more straight lines connects one member of the plurality of members and one other member of the plurality of members. The providing section moves to any one member of each of the one or more groups and provides distribution material.

BRIEF DESCRIPTION OF THE DRAWINGS

Exemplary embodiments of the present disclosure will be described in detail based on the following figures, wherein:

FIG. 3 is a diagram illustrating a functional configuration example of a printer used in the first exemplary embodiment;

FIG. 6 is a table illustrating exemplary division rules used in division of distribution targets into groups performed by a group setting unit;

FIG. 9A is a diagram which describes a method of setting groups by using division rule 3 and which illustrates the groups G1 to G3 before use of division rule 3;

FIG. 9B is a diagram which describes the method of setting groups by using division rule 3 and which illustrates the groups G11 to G15 obtained after use of division rule 3;

FIG. 10 is a table illustrating exemplary setting-route rules used in setting a movement route by a movement-route setting unit;

FIG. 11A is a diagram which describes an example of setting a movement route by using setting-route rule 1 and which illustrates an exemplary first route in which an obstacle blocking a move to the group G3 is present;

FIG. 11B is a diagram which describes the example of setting a movement route by using setting-route rule 1 and which illustrates an exemplary second route bypassing the obstacle;

FIG. 12A is a diagram which describes an example of setting a movement route by using setting-route rule 2 and which illustrates a first movement route;

FIG. 12B is a diagram which describes the example of setting a movement route by using setting-route rule 2 and which illustrates a second movement route;

FIG. 20 is a diagram for describing how to handle distribution in the case where one vacant seat is present in the example illustrated in FIG. 19;

FIG. 29 is a flowchart of an exemplary process in which necessary pieces of printed matter P are printed for each group;

DETAILED DESCRIPTION

Figure 1:
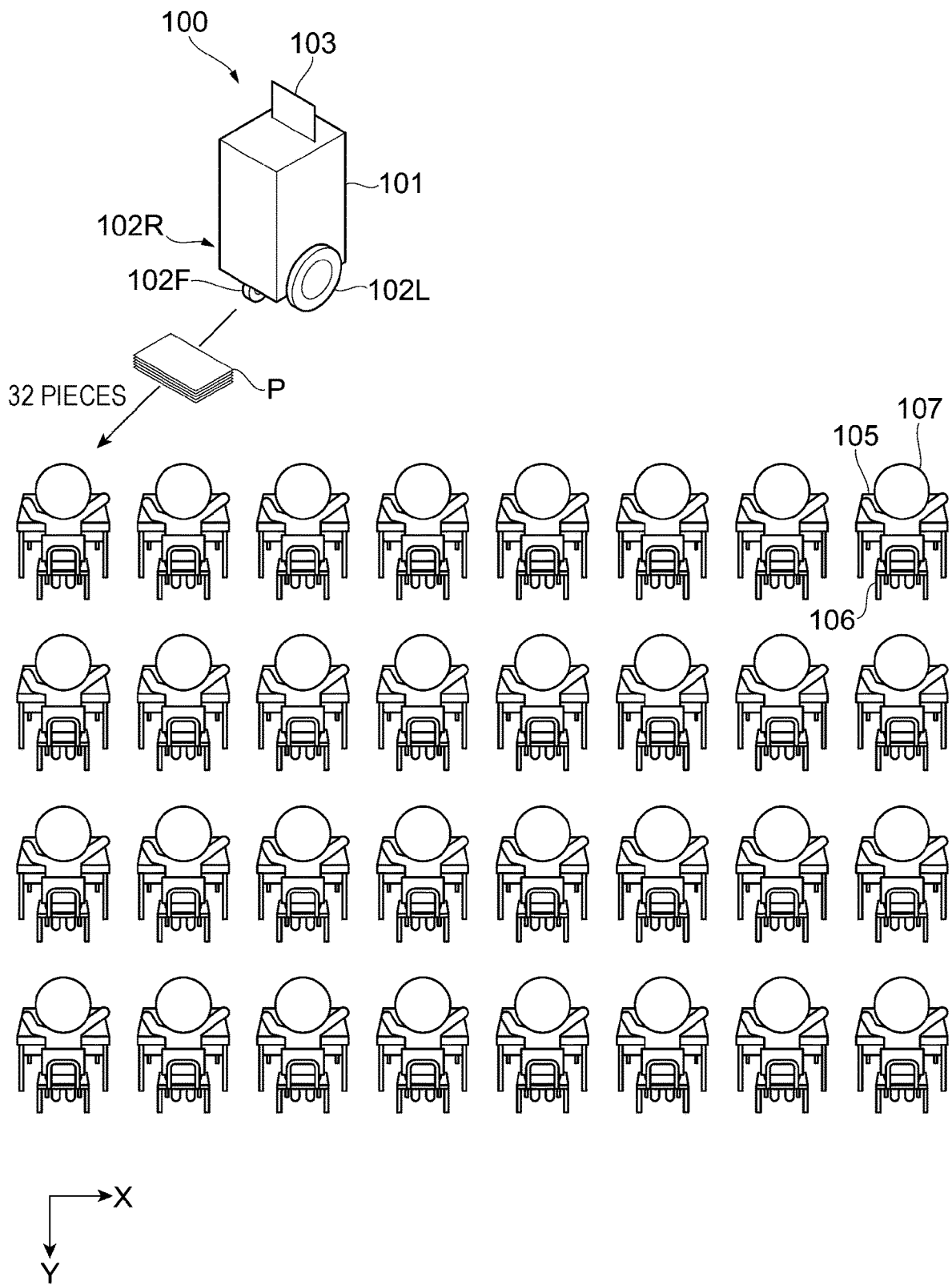
FIG. 1 is a diagram for describing an example of use of a self-propelled printer used in a first exemplary embodiment.

Referring to the drawings, exemplary embodiments of the present disclosure will be described below.

First Exemplary Embodiment

Exemplary Use of a Printer

FIG. 1 is a diagram for describing an example of use of a self-propelled printer 100 used in a first exemplary embodiment.

The printer 100 according to the first exemplary embodiment has a structure in which wheels 102L, 102R, and 102F for moving and a user interface 103 are attached to a box-shaped apparatus body 101.

The wheel 102F for steering is attached to a front part of the apparatus body 101. The wheels 102L and 102R for moving are attached to the right and left sides of the apparatus body 101.

The user interface 103 is used to provide information to a user and to receive user instructions. In FIG. 1, the user interface 103 is attached onto the top surface of the apparatus body 101.

The printer 100 is an exemplary mobile apparatus.

In FIG. 1, four pairs of a desk 105 and a chair 106 are arranged in the Y direction, and eight pairs are arranged in the X direction. Totally, 32 students 107 are seated.

In FIG. 1, the printer 100 moves to the student 107 at the leftmost position in the front row, and distributes 32 pieces of printed matter P. After that, the pieces of printed matter P are distributed to all of the 32 students by handing the pieces of printed matter P between students 107.

Exemplary Configuration of the Printer

Figure 2:
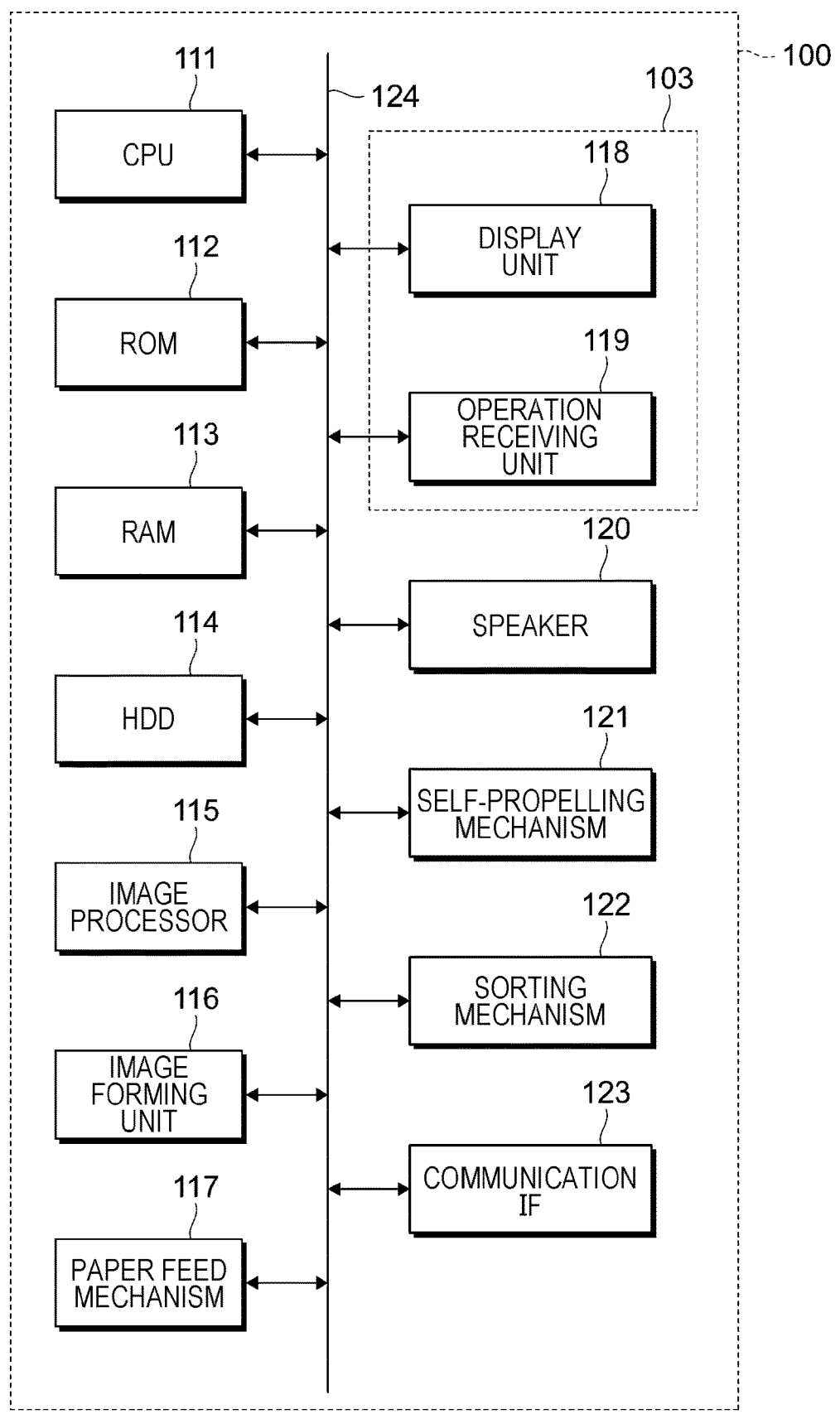
FIG. 2 is a diagram illustrating a hardware configuration example of a printer used in the first exemplary embodiment.

FIG. 2 is a diagram illustrating a hardware configuration example of the printer 100 used in the first exemplary embodiment.

The printer 100 includes a central processing unit (CPU) 111 that controls the entire apparatus through execution of programs (including firmware), a read-only memory (ROM) 112 used to store programs, such as a basic input output system (BIOS) and firmware, and a random access memory (RAM) 113 used as an execution area for programs.

The CPU 111, the ROM 112, and the RAM 113 function as a computer.

The printer 100 also includes a hard disk drive (HDD) 114, an image processor 115, an image forming unit 116, and a paper feed mechanism 117. The HDD 114 stores image data, management data, and the like. The image processor 115 performs image processing, such as color correction and gradation correction, on image data. The image forming unit 116 forms an image on a sheet, for example, by using an electrophotographic system or an inkjet system. The paper feed mechanism 117 extracts sheets one by one from an accommodating unit (not illustrated), and conveys each sheet to the image forming unit 116.

The image processor 115, the image forming unit 116, and the paper feed mechanism 117 are an exemplary printing section.

The printer 100 also includes a display unit 118 that displays a user interface screen and an operation receiving unit 119 that receives user operations. The display unit 118 and the operation receiving unit 119 are included in the user interface 103.

The printer 100 further includes a speaker 120 that outputs voice. The speaker 120 is used to inform a user, for example, of how to distribute the printed matter P.

The display unit 118 and the speaker 120 are an exemplary notification section.

The printer 100 includes a self-propelling mechanism 121 that drives the wheels 102L, 102R, and 102F to achieve moving in any direction. The self-propelling mechanism 121 according to the first exemplary embodiment includes a motor that drives the wheels 102L and 102R, and also includes a steering mechanism that controls the orientation of the wheel 102F. Rotation of the wheels 102L and 102R causes the apparatus body 101 to move forward or backward. The orientation of the wheel 102F causes the direction, in which the apparatus body 101 moves, to be switched.

The printer 100 according to the first exemplary embodiment includes a sorting mechanism 122 that sorts the printed matter P into stacks having respective predetermined numbers of pieces.

The printer 100 includes a communication interface (communication IF) 123 used in communication with the outside.

The units described above are connected to each other through a bus 124, and data is transferred to each other via the bus 124.

FIG. 3 is a diagram illustrating a functional configuration example of the printer 100 used in the first exemplary embodiment.

The functions illustrated in FIG. 3 are implemented by the CPU 111 executing programs.

FIG. 3 illustrates some functions necessary for distribution of the printed matter P, among the functions implemented through the execution of programs.

The printer 100 includes a distribution-target position acquiring unit 131, a spatial-layout acquiring unit 132, a group setting unit 133, a movement-route setting unit 134, a current-position acquiring unit 135, a movement controller 136, a printing controller 137, a notification controller 138, and a sorting controller 139. The distribution-target position acquiring unit 131 acquires the positions of distribution targets of the printed matter P. The spatial-layout acquiring unit 132 acquires layout information of the space in which the distribution targets are located. The group setting unit 133 divides the distribution targets into groups each having multiple persons. The movement-route setting unit 134 sets a route for distributing the printed matter P to the groups. The current-position acquiring unit 135 acquires the current position of the printer 100. The movement controller 136 controls moves of the printer 100. The printing controller 137 controls printing. The notification controller 138 controls notification to distribution targets. The sorting controller 139 controls sorting of the printed matter P.

The distribution targets indicate persons receiving distribution of the printed matter P.

Figure 4A:
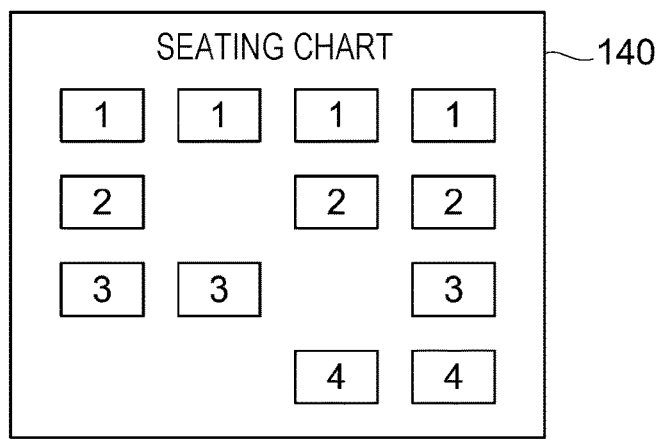
FIG. 4A is diagram for describing an exemplary method using a seating chart in acquisition of the positions of distribution targets performed by a distribution-target position acquiring unit.
Figure 4B:
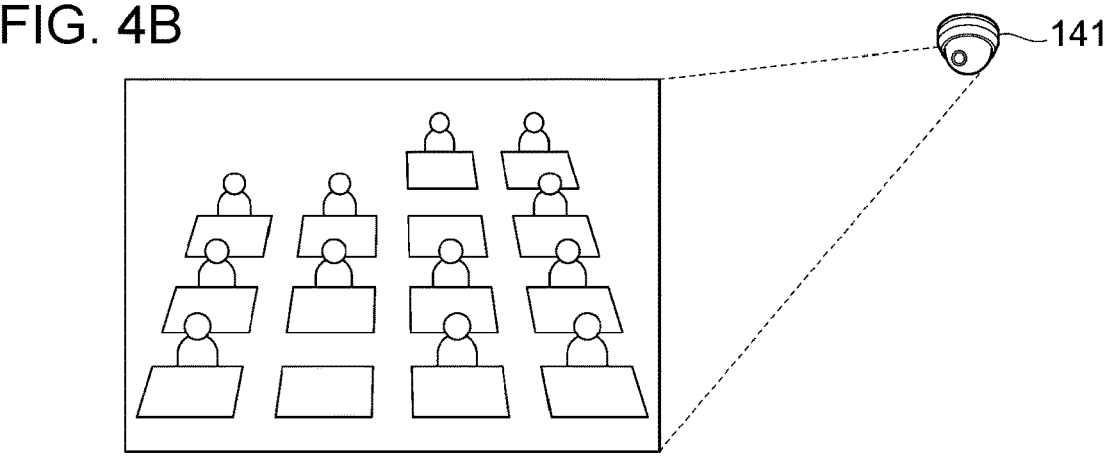
FIG. 4B is diagram for describing an exemplary method using a site image, which is captured by using a camera, in acquisition of the positions of distribution targets performed by the distribution-target position acquiring unit.
Figure 4C:
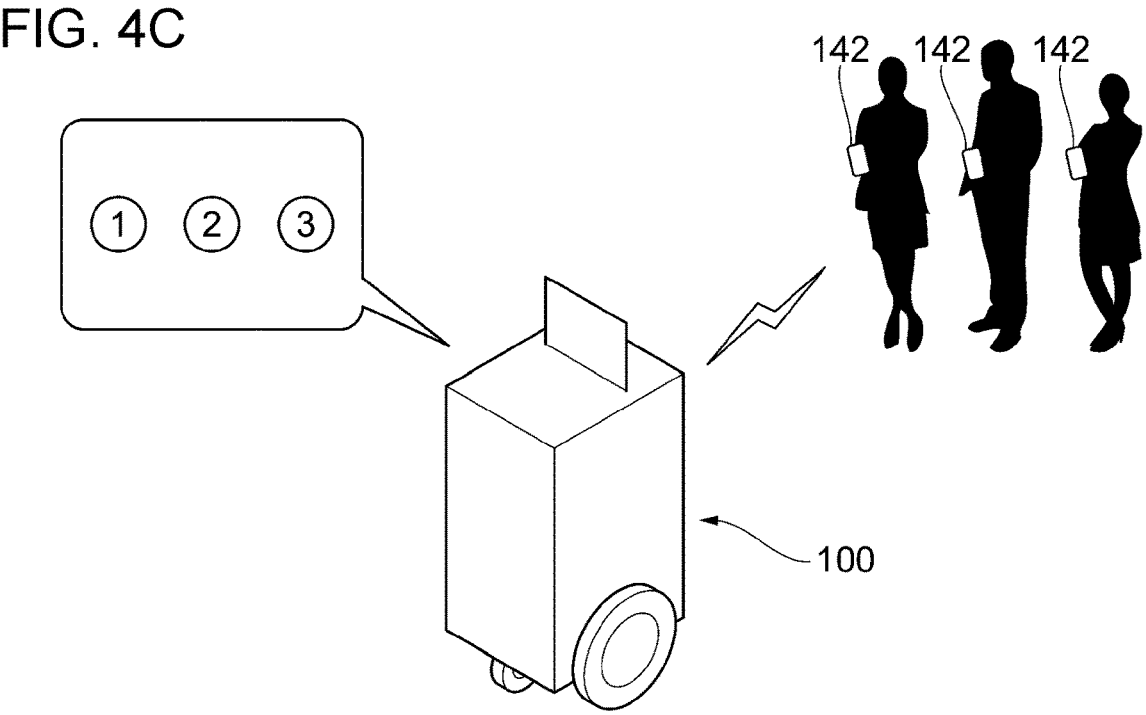
FIG. 4C is a diagram for describing an exemplary method which is used to detect the positions of distribution targets through communication with terminals held by the distribution targets and which is used in acquisition of the positions of distribution targets performed by the distribution-target position acquiring unit.

FIGS. 4A to 4C are diagrams for describing exemplary methods used in acquisition of information (positional information) about the positions of distribution targets performed by the distribution-target position acquiring unit 131 (see FIG. 3). FIG. 4A illustrates a method using a seating chart 140. FIG. 4B illustrates a method using a site image captured by using a camera 141. FIG. 4C illustrates a method of detecting the positions through communication with terminals 142 held by distribution targets. A method of obtaining information about the positions of distribution targets is not limited to the methods illustrated in FIGS. 4A to 4C.

The distribution-target position acquiring unit 131 according to the first exemplary embodiment may have any configuration as long as the positions of distribution targets are obtained. That is, it is not necessary to identify individuals. Therefore, it is not necessary for the distribution-target position acquiring unit 131 to have a function of recognizing faces or authenticating individuals. However, this does not indicate exclusion of the state in which the distribution-target position acquiring unit 131 is provided with a function of recognizing faces and/or a function of authenticating individuals.

The distribution-target position acquiring unit 131 is an exemplary positional-information acquiring section.

The seating chart 140 illustrated in FIG. 4A may be obtained as image data, or may be obtained through a user operation. For example, an image reading apparatus (a so-called scanner) may be used to read a hand-written seating chart 140 or a printed seating chart 140 on a sheet.

The image reading apparatus may be included in the printer 100 (see FIG. 1) or may be prepared as a separate apparatus. When the image reading apparatus is prepared as a separate apparatus, image data obtained by reading the seating chart 140 is acquired by the printer 100 through the communication interface 123 (see FIG. 2).

The positions of distribution targets may be given through a user operation performed on the seating chart 140 displayed on the display unit 118 (see FIG. 2). For example, while a user views the seating chart 140 displayed on the display unit 118, the user gives information about the positions at which distribution targets are seated or the positions of vacant seats.

As illustrated in FIG. 4B, the method using a captured site image includes the case in which a site image captured by the camera 141 installed in the space in which distribution targets are located is used, the case in which a site image captured by using a camera (not illustrated) installed on the mobile printer 100 is used, and the case in which a site image captured by a user, who is present in the site, with their camera (for example, a smartphone) is used.

The image data captured in the outside of the printer 100 is acquired by the printer 100 through the communication interface 123 (see FIG. 2).

In this case, the printer 100 processes the image and detects the relationship of the positions and distances of the distribution targets.

In the case of using an image, the latest spatial layout information may be also obtained.

As illustrated in FIG. 4C, if the terminals 142 are used, even when the seating chart 140 or the like is not present, the positions of distribution targets may be obtained. For example, use of the terminals 142 is desirable for distribution of the printed matter P in a space in which there are no fixed seats.

The terminals 142 may be smartphones, tablet terminals, or other equipment as long as they are equipment including a sensor detecting the position, such as a Global Positioning System (GPS) receiver.

There is a technique of detecting a position with a few centimeters accuracy even indoors.

In the example illustrated in FIG. 4C, the printer 100 recognizes that there are three distribution targets who are positioned side by side, through wireless communication with the terminals 142.

Figure 5A:
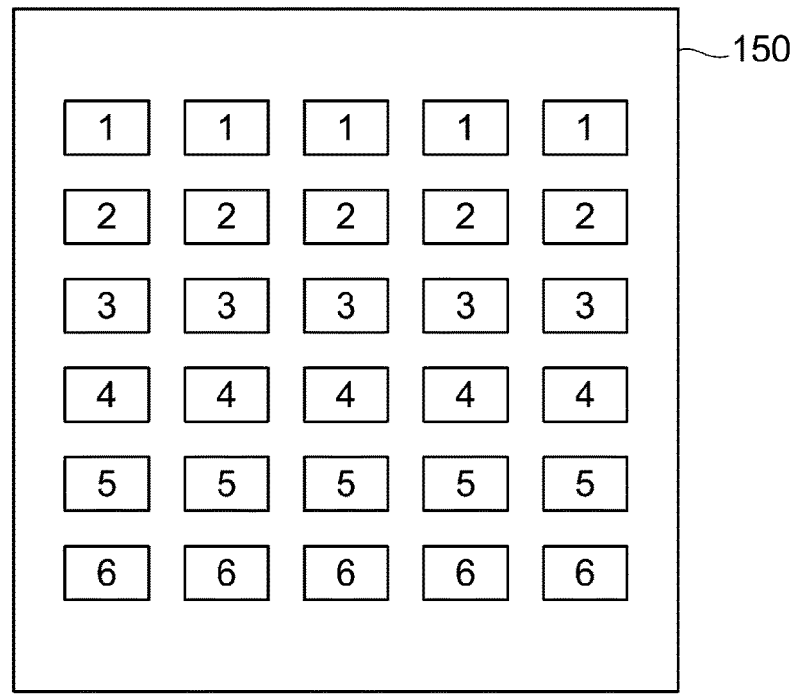
FIG. 5A is a diagram for describing exemplary layout information acquired by a spatial-layout acquiring unit, and is a plan view of the arrangement of seats.
Figure 5B:
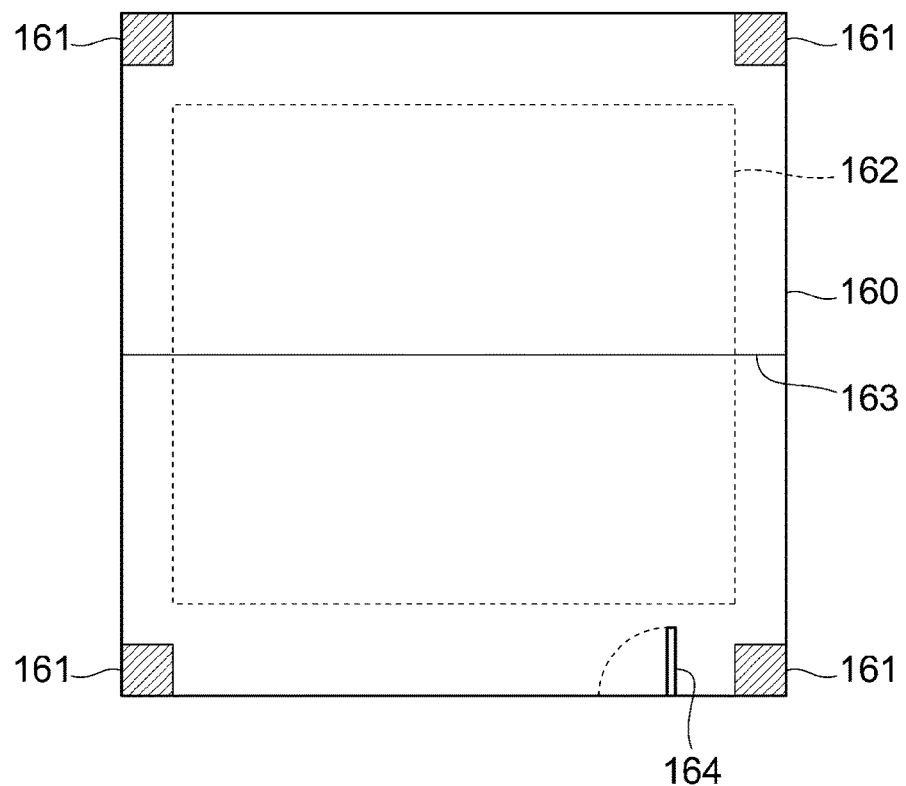
FIG. 5B is a diagram for describing the exemplary layout information acquired by the spatial-layout acquiring unit, and is a structural drawing of the space.

FIGS. 5A and 5B are diagrams for describing exemplary layout information obtained by the spatial-layout acquiring unit 132 (see FIG. 3). FIG. 5A is a plan view 150 of the arrangement of seats. FIG. 5B is a structural drawing 160 of the space.

FIG. 5A illustrates a space in which seats are arranged in six rows and five columns, and in which an empty space is present around the seating area.

FIG. 5B illustrates a space in which pillars 161 are disposed at the four corners; there is an empty space around an area 162 in which seats are arranged; a step 163 is present across the space; and a door 164 is provided on one of the walls. In FIG. 5B, the range in which the door 164 moves is illustrated by using a dashed line.

The spatial-layout acquiring unit 132 is an exemplary layout information acquiring section.

FIG. 6 is a table illustrating exemplary division rules used in division of distribution targets into groups performed by the group setting unit 133 (see FIG. 3).

FIG. 6 illustrates division rules 1 to 3. In formation of groups, it is not necessary to use all of these rules. In addition, a rule (not illustrated) may be used.

The group setting unit 133 is an exemplary group setting section.

Division rule 1 indicates that each of the members included in the same group is positioned so as to be connected to all of the other members directly or indirectly through at least one line which has a length of the predetermined reference distance REF or shorter and which connects one member to another.

Division rule 2 indicates that each group has a predetermined number of members or fewer.

Division rule 2 is similar, for example, to a state in which the number of pieces of distribution material distributed in each group is the predetermined number or less, and a state in which the time required for distribution in a group is a predetermined time or shorter. The time required for distribution in a group may be calculated if the time per person which is required to hand the printed matter P over in the same group is given in advance.

Division rule 3 indicates that there is a route along which the printer 100 may move to at least one person in each group. Division rule 3 requires that the printer 100 does not have difficulty in moving to the groups obtained through division.

Figure 7:
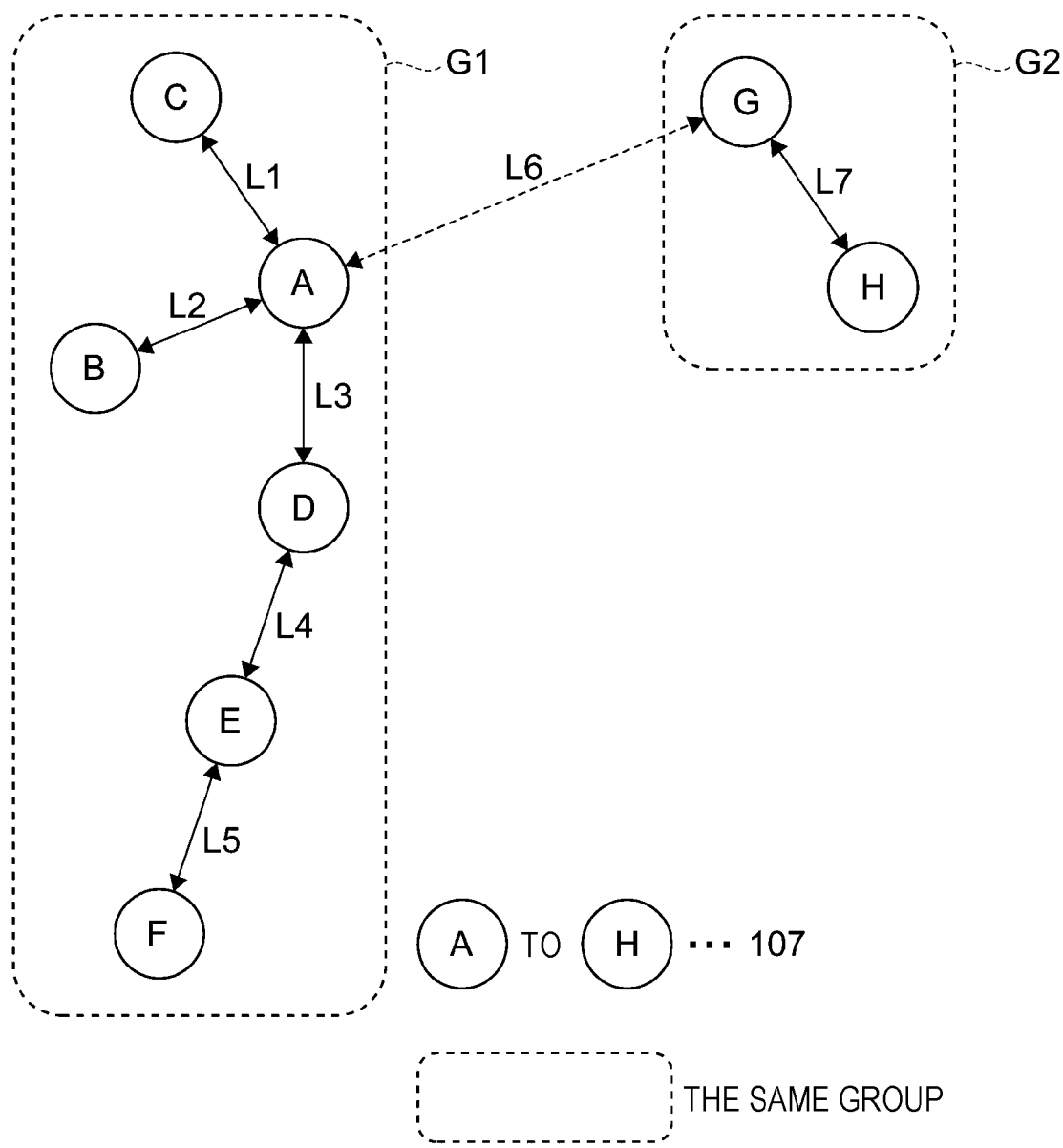
FIG. 7 is a diagram for describing a method of setting groups by using division rule 1.

FIG. 7 is a diagram for describing a method of setting groups by using division rule 1.

In FIG. 7, the distance L1 indicates the distance of a straight line connecting the distribution targets A and C. The distance L2 indicates the distance of a straight line connecting the distribution targets A and B. The distance L3 indicates the distance of a straight line connecting the distribution targets A and D. The distance L4 indicates the distance of a straight line connecting the distribution targets D and E. The distance L5 indicates the distance of a straight line connecting the distribution targets E and F. The distance L6 indicates the distance of a straight line connecting the distribution targets A and G. The distance L7 indicates the distance of a straight line connecting the distribution targets G and H.

Among these, only the distance L6 is longer than the reference distance REF. The other distances L1 to L5 and L7 are shorter than the reference distance REF. In the first exemplary embodiment, it is assumed that the reference distance REF is a distance over which distribution targets may hand the printed matter P to each other. The length required to hand the printed matter P over depends on the assumed build of a distribution target. Therefore, the reference distance REF is desirably determined in consideration of the build of a distribution target. For example, the reference distance REF is set to 1 m.

In FIG. 7, if the distribution targets A and G are included in the same group, division rule 1 is not satisfied.

Therefore, in the example in FIG. 7, the eight distribution targets are divided into the two groups G1 and G2.

The group G1 has the six distribution targets A, B, C, D, E, and F; and the group G2 has the two distribution targets G and H.

The reference distance REF is an exemplary predetermined threshold.

Figure 8A:
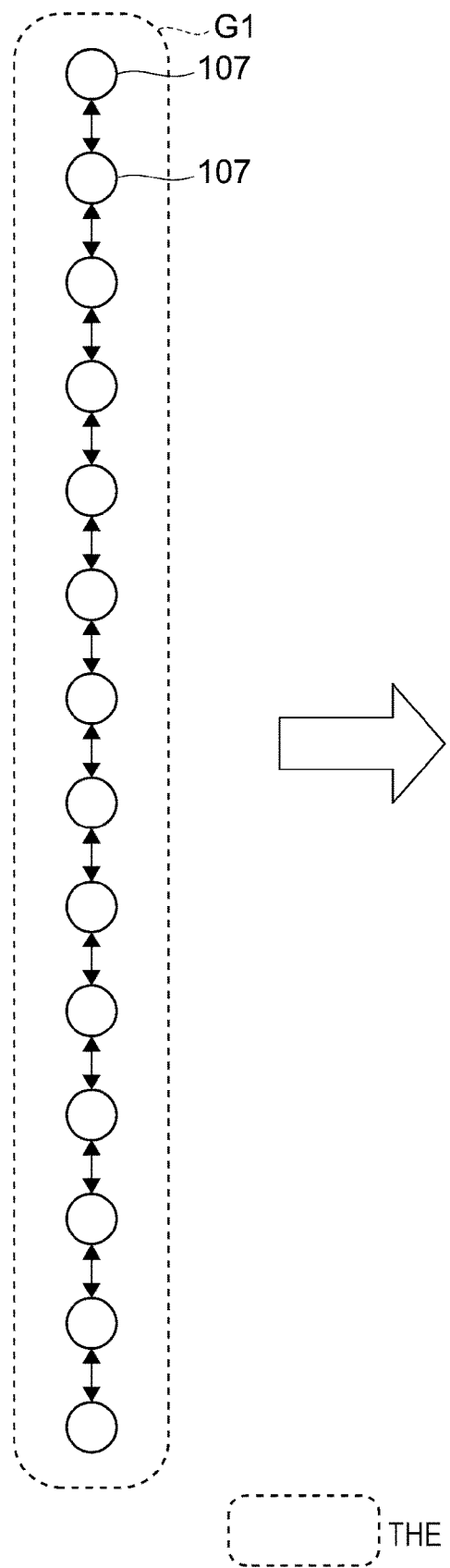
FIG. 8A is a diagram which describes a method of setting groups by using division rule 2 and which illustrates the group G1 before use of division rule 2.
Figure 8B:
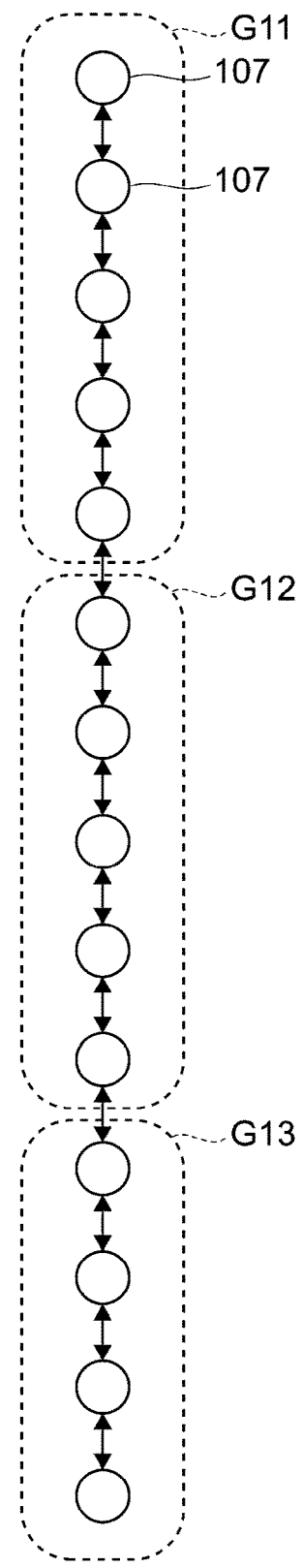
FIG. 8B is a diagram which describes the method of setting groups by using division rule 2 and which illustrates the groups G11, G12, and G13 obtained after use of division rule 2.

FIGS. 8A and 8B are diagrams for describing a method of setting groups by using division rule 2. FIG. 8A illustrates the group G1 which is set before use of division rule 2. FIG. 8B illustrates the groups G11, G12, and G13 obtained after use of division rule 2.

Division rule 2 is made under the assumption of the case in which too many members are included in a group when only division rule 1 is applied.

For example, in the example in FIG. 1, the 32 students 107 belong to a single group. In this case, the time until the printed matter P is distributed to all of the students is apt to be long. In addition, if many pieces of the printed matter P are to be distributed, the pieces of the printed matter P are difficult to handle. Thus, a great workload is placed on students 107 located on the upstream side of the route along which the printed matter P is distributed.

In FIGS. 8A and 8B, the group G1 before use of division rule 2 has 14 students 107. In contrast, the groups G11 and G12 after use of division rule 2 each have five students 107. The group G13 has four students 107.

In FIGS. 8A and 8B, the division is made on a base of five members. As a matter of course, five members are exemplary, and fewer or more members may be used as a base.

The number of members used as a division base is desirably capable of being set or changed every time the printed matter P is distributed.

FIGS. 9A and 9B are diagrams for describing a method of setting groups by using division rule 3. FIG. 9A illustrates the groups G1 to G3 which are set before use of division rule 3. FIG. 9B illustrates the groups G11 to G15 obtained after use of division rule 3.

In FIG. 9A, students 107 are arranged in five rows and three columns, and the groups G1 to G3 are set for the respective columns.

However, a step 163 is present between the second column and the third column from the left to the right in FIG. 9A.

Therefore, the printer 100 is capable of moving in the row direction (X direction) to the students 107 at the top of the first and second columns. However, the printer 100 is not capable of moving to the student 107 at the top of the third column.

In contrast, in FIG. 9B, the printer 100 is capable of moving to the fifth row in the column direction (Y direction).

Thus, in view of division rule 3, the five groups G11 to G15 are set for the respective rows.

FIG. 10 is a table illustrating exemplary setting-route rules used in setting a movement route by the movement-route setting unit 134 (see FIG. 3).

FIG. 10 illustrates setting-route rules 1 to 4. In setting a movement route, it is not necessary to use all of these rules. In addition, a rule (not illustrated) may be used.

Setting-route rule 1 indicates that there is a route which allows the printer 100 to move to at least one member in each group which has been set.

Setting-route rule 2 indicates that the distance over which the printer 100 moves to the groups one by one is shorter than other candidates. Setting-route rule 2 is based on the assumption that, the shorter the distance over which the printer 100 moves is, the earlier distribution of the printed matter P starts. It is assumed that earlier start of distribution of the printed matter P causes the distribution to all of the distribution targets to end earlier.

Setting-route rule 3 indicates that the printer 100 is capable of moving first to a group having the largest number of members. Setting-route rule 3 is based on an empirical rule that, the more the number of members in a group is, the longer the time until the printed matter P is distributed to all of the members is.

Setting-route rule 4 indicates that the printer 100 is capable of moving last to a group having the smallest number of members. Setting-route rule 4 is based on an empirical rule that, the less the number of members in a group is, the shorter the time until the printed matter P is distributed to all of the members is.

The movement-route setting unit 134 is given in advance, for example, information about the size of the printer 100 and the physical condition under which the printer 100 is capable of moving.

The information about the size of the printer 100 includes, for example, width W, depth L, and height H. The physical condition under which the printer 100 is capable of moving includes, for example, the width of a passage, information about a step over which the printer 100 is capable of passing, and the angle of a slope along which the printer 100 is capable of moving.

The movement-route setting unit 134 is an exemplary route setting section.

FIGS. 11A and 11B are diagrams for describing an example of setting a movement route by using setting-route rule 1. FIG. 11A illustrates an exemplary first route in which an obstacle 171 blocking a move to the group G3 is present. FIG. 11B illustrates an exemplary second route bypassing the obstacle 171.

Also in FIGS. 11A and 11B, students 107 are arranged in five rows and three columns, and the groups G1 to G3 are set for the respective columns. However, in FIGS. 11A and 11B, the obstacle 171 is present between the second column and the third column.

The first route goes from the initial position in the row direction (X direction). However, along the first route, the printer 100 is not capable of moving to the group G3 because the obstacle 171 blocks the move of the printer 100. Therefore, the first route does not satisfy setting-route rule 1.

In contrast, the second route goes from the initial position counterclockwise. Along the second route, although the movement route is longer, the printer 100 may move to all of the groups G1 to G3.

Therefore, in FIGS. 11A and 11B, the second route is selected rather than the setting-route rule 1.

FIGS. 12A and 12B are diagrams for describing an example of setting a movement route by using setting-route rule 2. FIG. 12A illustrates a first movement route. FIG. 12B illustrates a second movement route.

Also in FIGS. 12A and 12B, students 107 are arranged in five rows and three columns, and the groups G1 to G3 are set for the respective columns.

In the case of the first route, the printer 100 moves in the row direction (X direction). That is, the printer 100 moves in an I shape.

In contrast, in the case of the second route, the printer 100 moves in the column direction (−Y direction), and then changes the direction to move in the row direction (X direction). That is, the printer 100 moves in an L shape.

Therefore, the distance L1 required for the move along the first route is shorter than the distance L2 required for the move along the second route.

Accordingly, comparison of the first route with the second route leads to selection of the first route using setting-route rule 2.

Figure 13:
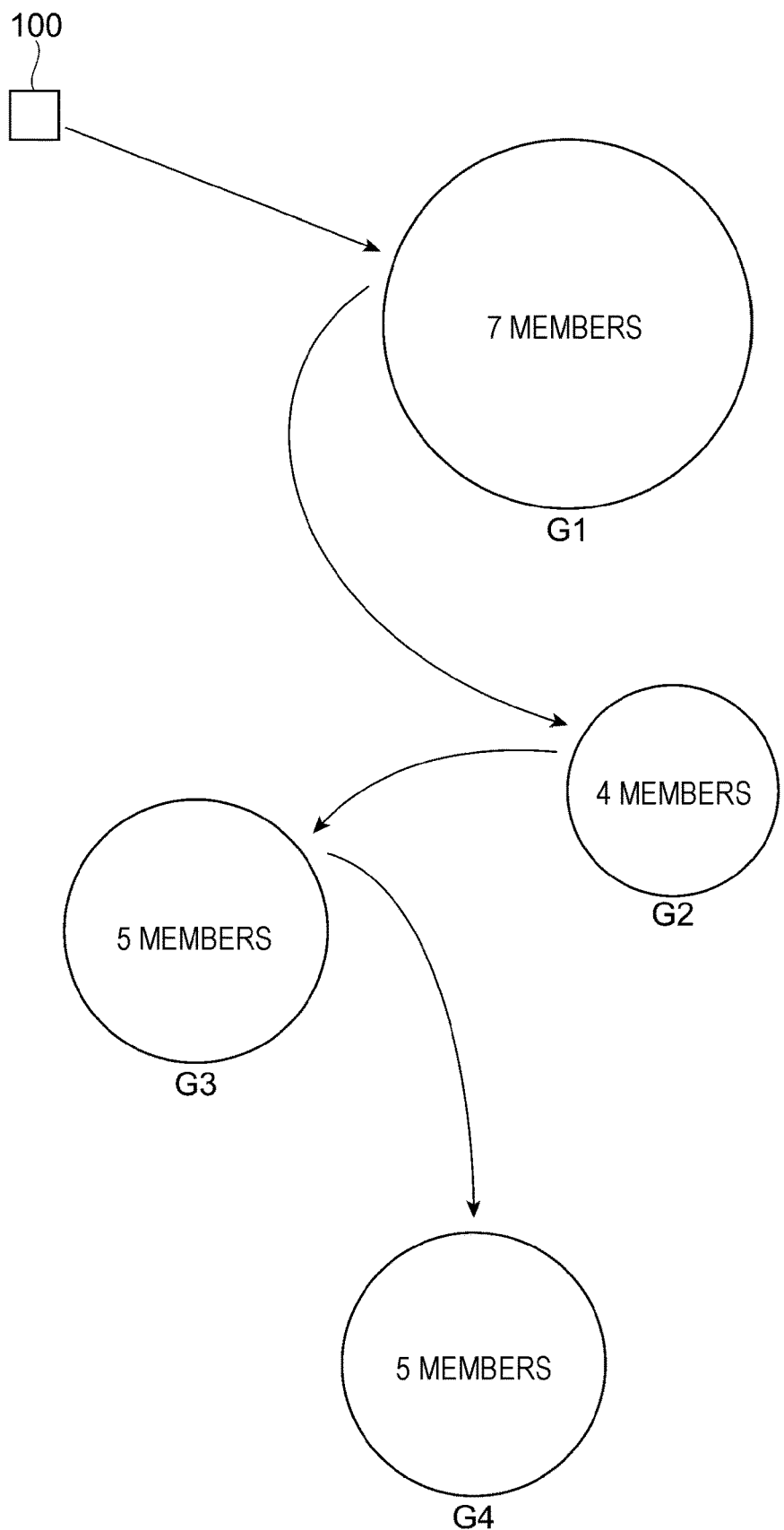
FIG. 13 is a diagram for describing an example of setting a movement route by using setting-route rule 3.

FIG. 13 is a diagram for describing an example of setting a movement route by using setting-route rule 3.

In FIG. 13, the group G1 has seven members; the group G2, four members; the group G3, five members; and the group G4, five members.

As described above, setting-route rule 3 describes the condition that the printer 100 moves first to a group having the largest number of members. Therefore, in FIG. 13, the printer 100 moves first to the group G1 having seven members, and then moves to the group G2, the group G3, and the group G4, in this sequence determined based on the state in which groups are located close to each other.

When there are multiple groups having the largest number of members, a route may be determined so that any selected group is set to the first move destination, or in consideration of another rule.

Figure 14:
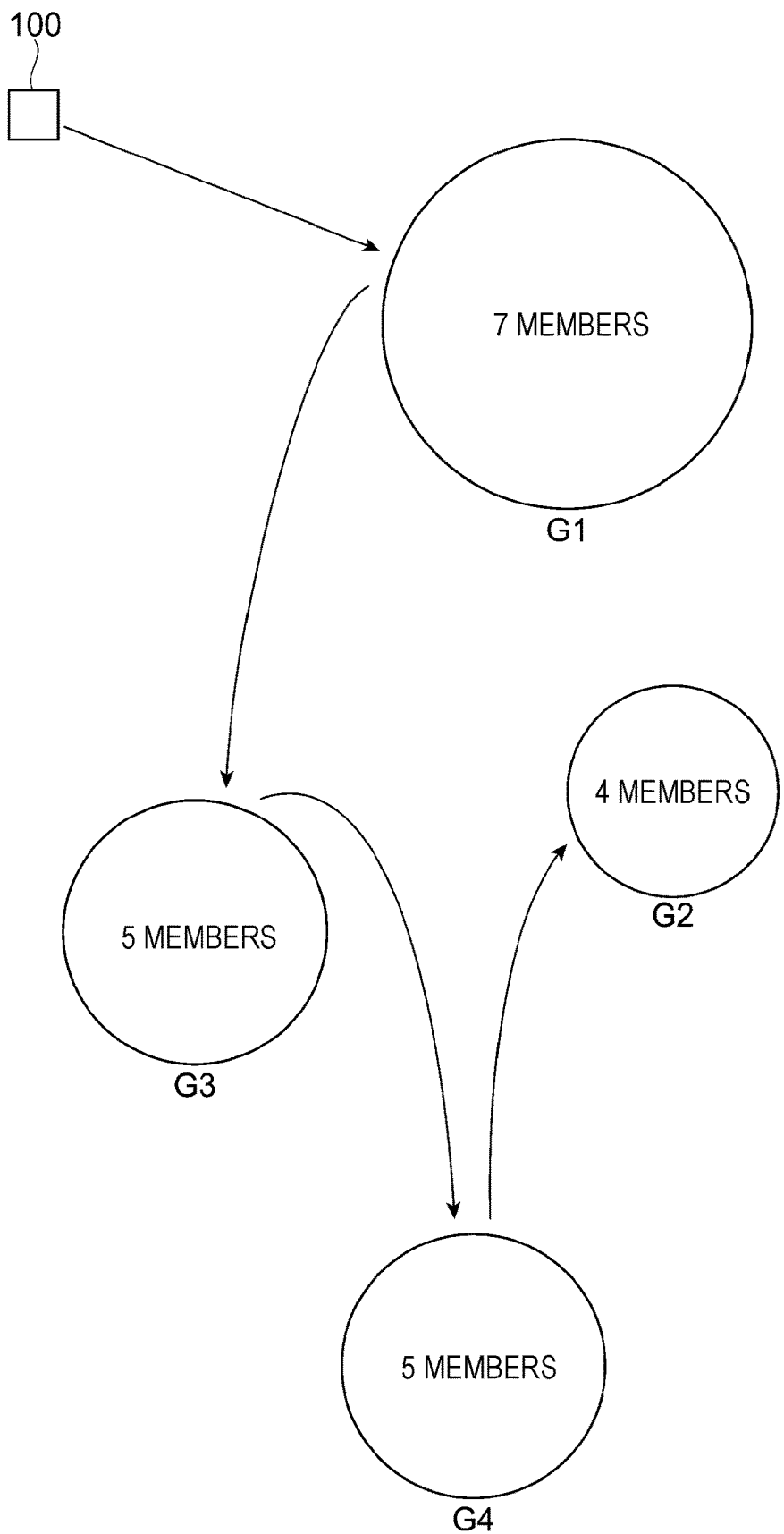
FIG. 14 is a diagram for describing an example of setting a movement route by using setting-route rule 4.

FIG. 14 is a diagram for describing an example of setting a movement route by using setting-route rule 4.

Also in FIG. 14, the group G1 has seven members; the group G2, four members; the group G3, five members; and the group G4, five members.

As described above, setting-route rule 4 describes the condition that the printer 100 moves last to a group having the smallest number of members. Therefore, in FIG. 14, after the printer 100 moves to the group G1, the group G3, and the group G4, and then moves to the group G4 having four members.

When there are multiple groups having the smallest number of members, a route may be determined so that any selected group is set to the last move destination, or in consideration of another rule.

Back to FIG. 3, the current-position acquiring unit 135 receives, for example, radio waves from a GPS satellite, radio waves emitted from a beacon for indoor positioning, or radio waves from multiple access points, and thus detects the position of the printer 100. A method of determining the position of the printer 100 by using an autonomous navigation system may be used by itself or in combination with other methods.

The movement controller 136 controls the self-propelling mechanism 121 (see FIG. 2) on the basis of the current position of the printer 100 and information about the route which has been set. For example, the printer 100 is controlled so as to move forward or backward, stop, and change the heading direction. The self-propelling mechanism 121 is an exemplary providing section.

The printing controller 137 is used to control forming an image on a sheet. The control also includes, for example, execution, stopping, and restart of printing. In addition, the control includes switching information that is to be printed.

The notification controller 138 controls notification of information or the like for assisting in distribution of the printed matter P. For example, the notification controller 138 switches text displayed on the display unit 118, or switches voice that is output from the speaker 120 (see FIG. 2).

The sorting controller 139 controls operations of the sorting mechanism 122 (see FIG. 2) so that the required time for extraction of the printed matter P in each group is reduced.

Process Performed in Distribution of the Printed Matter P

Figure 15:
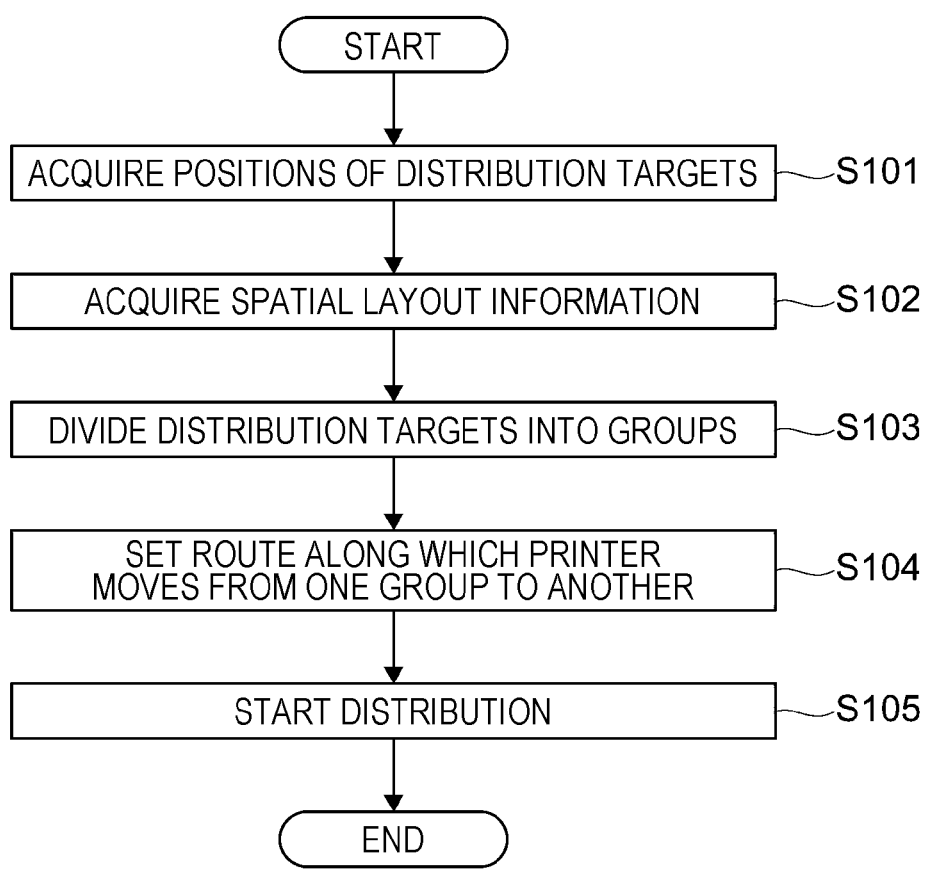
FIG. 15 is a flowchart of a process example performed in distribution of printed matter P by using a printer according to the first exemplary embodiment.

FIG. 15 is a flowchart of a process example performed in distribution of the printed matter P by using the printer 100 according to the first exemplary embodiment.

The process in FIG. 15 is implemented by the CPU 111 (see FIG. 2) executing programs.

The CPU 111 acquires the positions of distribution targets (step 101). Specifically, the distribution-target position acquiring unit 131 (see FIG. 3) described above acquires the positions of the distribution targets.

The CPU 111 acquires the spatial layout information (step 102). Specifically, the spatial-layout acquiring unit 132 (see FIG. 3) described above acquires the spatial layout information.

The CPU 111 divides the distribution targets into groups (step 103). The number of groups obtained through division is not limited to more than one, and may be one. Specifically, the group setting unit 133 (see FIG. 3) described above acquires the spatial layout information.

In the first exemplary embodiment, the group setting unit 133 uses both of information about the positions of the distribution targets and the spatial layout information to set groups.

When groups are set, the CPU 111 sets a route along which the printer 100 moves from one group to another (step 104).

When the route is set, the CPU 111 starts distribution of the printed matter P (step 105). That is, the CPU 111 causes the printer 100 to move according to the route which has been set and to hand the printed matter P to each group.

EXAMPLES

Examples of distribution will be described below.

First Example

Figure 16:
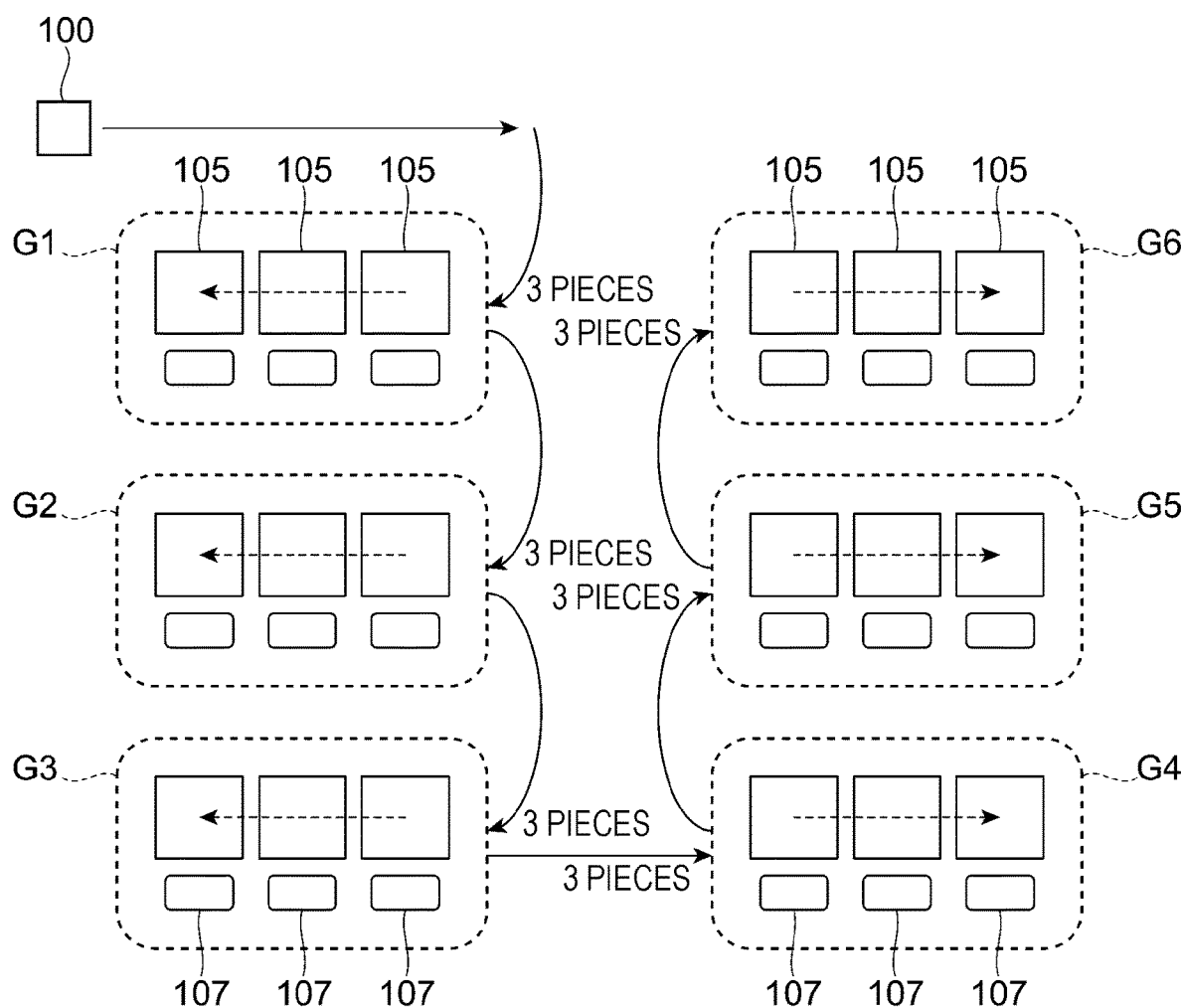
FIG. 16 is a diagram for describing first exemplary distribution.

FIG. 16 is a diagram for describing first exemplary distribution.

In FIG. 16, 18 students 107 are associated with the respective desks 105. In FIG. 16, every three students, among the 18 students 107, who are arranged side by side at a distance shorter than the reference distance REF, are included in any one of the six groups G1 to G6.

The reference distance REF is an exemplary threshold.

The printer 100 in FIG. 16 moves first to the group G1, and distributes three pieces of the printed matter P to the nearest student 107.

Then, the printer 100 moves to the group G2, and distributes three pieces of the printed matter P to the nearest student 107. Similarly, the printer 100 moves to the groups G3, G4, G5, and G6, and distributes three pieces of the printed matter P to each group.

In FIG. 16, the printer 100 distributes the printed matter P to one group at a time. However, if conditions allow, the printer 100 may distribute the printed matter P to multiple groups at the same time.

For example, when the printer 100 moves through the space between the groups G1 to G3, which are positioned on the left in FIG. 16, and the groups G4 to G6, which are positioned on the right in FIG. 16, if the printer 100 may be reached from both the left and right sides, the printer 100 may distribute the printed matter P to two groups (for example, the group G1 and the group G6) at the same time. In this case, the printer 100 may complete the distribution only by moving in the direction from the group G1 to the group G3.

In FIG. 16, the direction in which the printed matter P is handed in each group is indicated by using a dashed line.

Second Example

Figure 17:
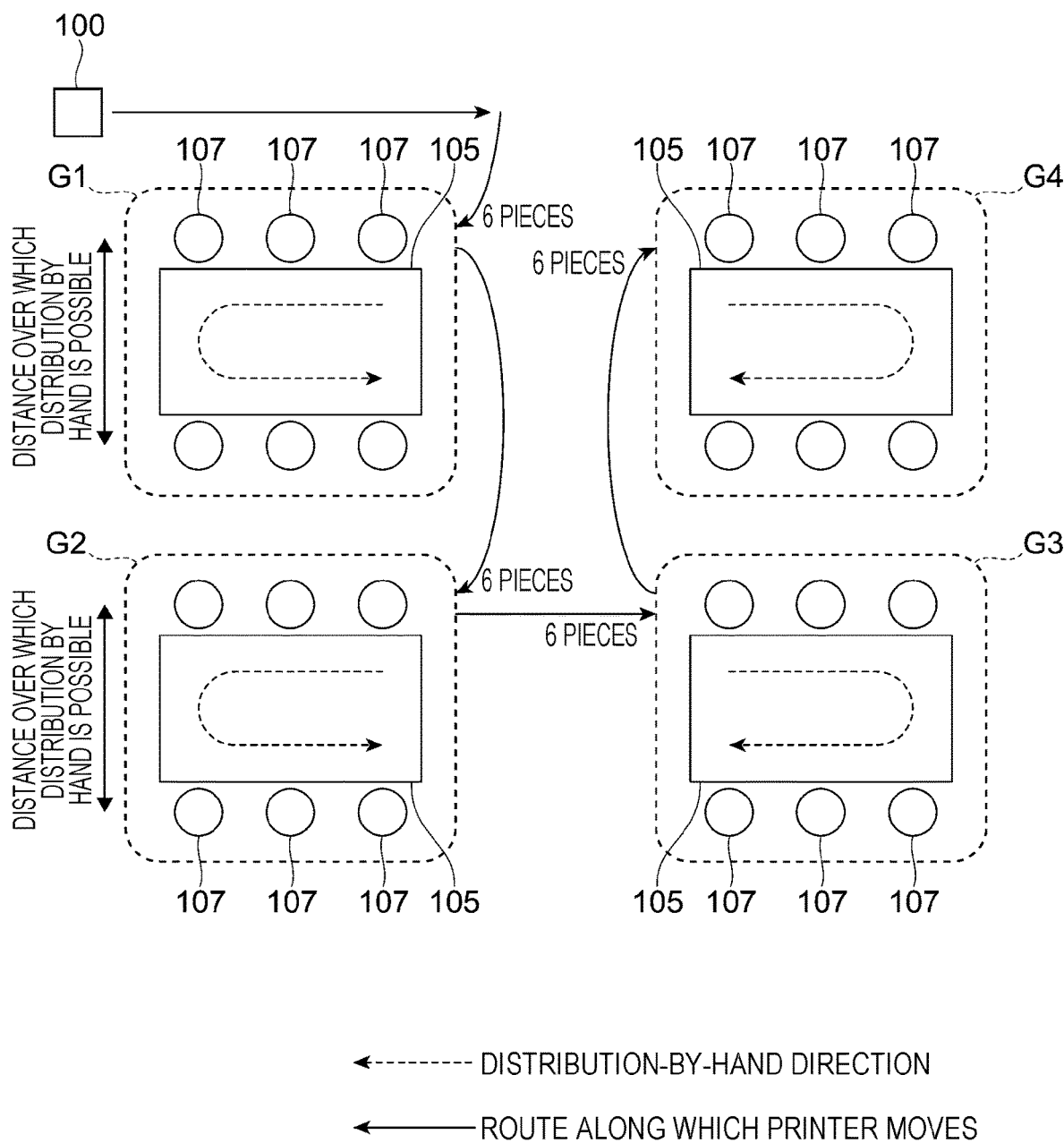
FIG. 17 is a diagram for describing second exemplary distribution.

FIG. 17 is a diagram for describing second exemplary distribution.

In FIG. 17, six students 107 are positioned so as to face each other with a single desk 105 disposed in-between. In addition, the distance between students 107 facing each other with the desk 105 disposed in-between is such that the printed matter P may be handed over.

Therefore, in FIG. 17, six pieces of the printed matter P are distributed to each of the four groups G1 to G4. The printed matter P is handed over in a U shape in each group.

Third Example

Figure 18:
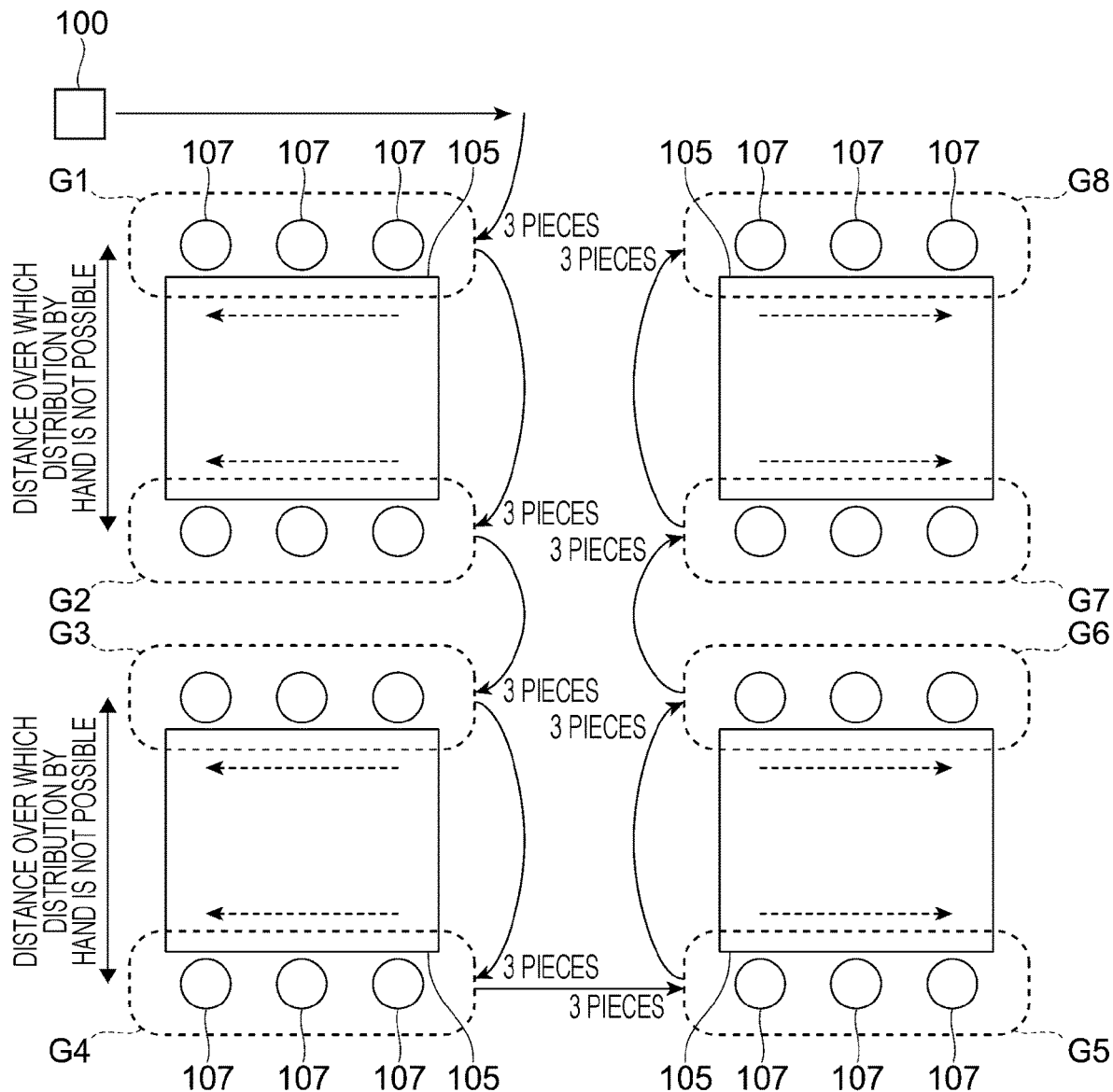
FIG. 18 is a diagram for describing third exemplary distribution.

FIG. 18 is a diagram for describing third exemplary distribution.

FIG. 18 illustrates a spatial layout similar to that in FIG. 17. However, a desk 105 has a wider width. It is not possible for students 107 facing each other with the desk 105 disposed in-between to hand the printed matter P over to each other.

Therefore, in FIG. 18, three students arranged in the same row are regarded as a unit, and the eight groups G1 to G8 are set.

In this example, the printer 100 distributes three pieces of the printed matter P to each of the eight groups G1 to G8. In FIG. 18, the printed matter P is handed over in an I shape in each group.

Fourth Example

Figure 19:
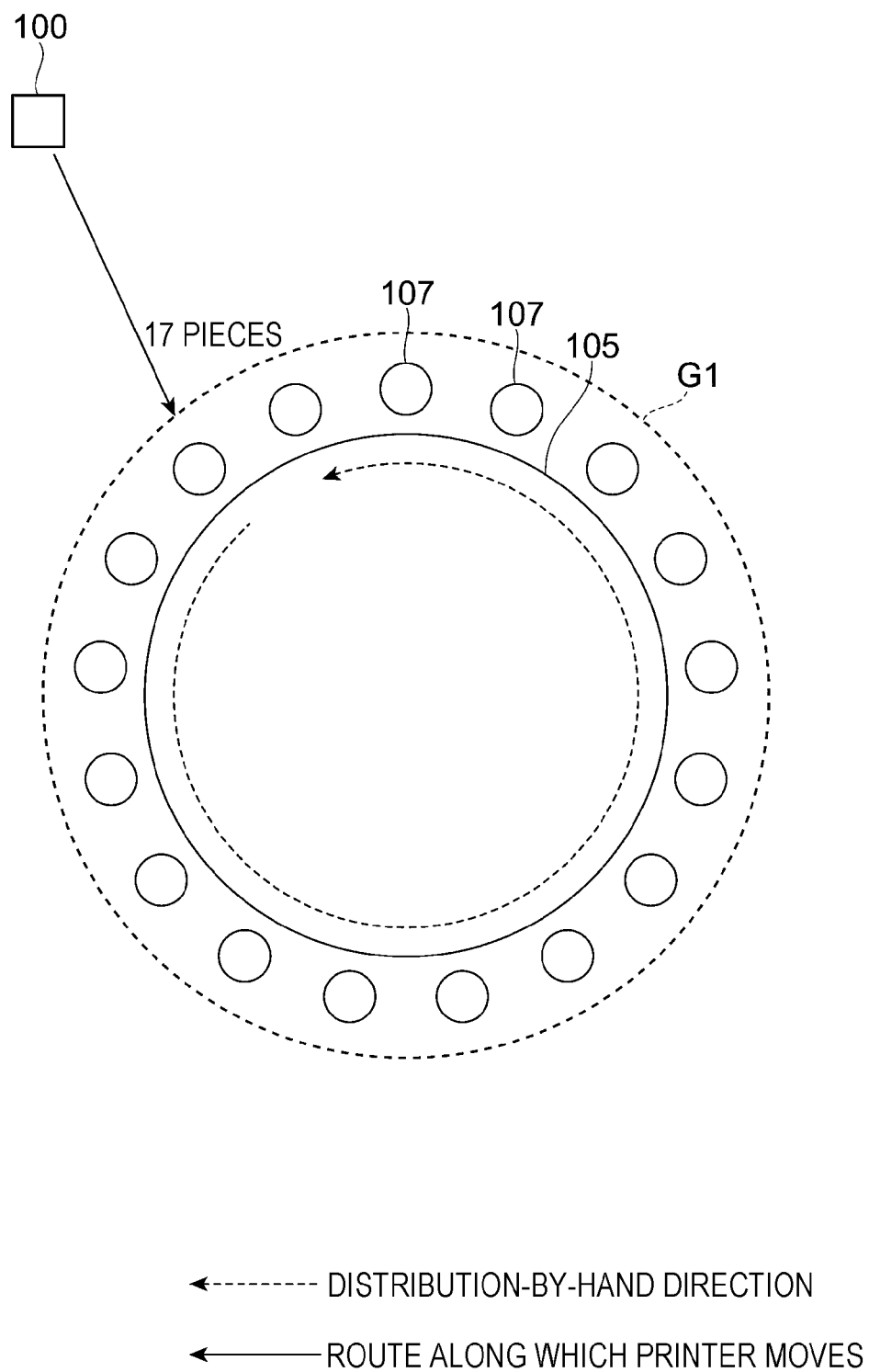
FIG. 19 is a diagram for describing fourth exemplary distribution.

FIG. 19 is a diagram for describing fourth exemplary distribution.

In FIG. 19, the case is assumed in which 17 students 107 are positioned along the outer edge of a circular desk 105, and in which each student 107 may hand the printed matter P over to an adjacent student 107.

Therefore, in FIG. 19, the 17 students are handled as being included in the single group G1. The printer 100 distributes 17 pieces of the printed matter P to one student in the group G1.

In FIG. 19, the printed matter P is sequentially handed over to the next student 107 counterclockwise in the group G1.

Alternatively, the printed matter P may be distributed from a student 107, who serves as the starting point, in both the clockwise direction and the counterclockwise direction.

FIG. 20 is a diagram for describing how to handle distribution in the case where one vacant seat is present in the example in FIG. 19.

In FIG. 20, components corresponding to those in FIG. 19 are designated with the same reference characters.

In FIG. 20, since there is one vacant seat, 16 pieces of the printed matter P are distributed to one student in the group G1.

In the example in FIG. 20, the printed matter P is handed over clockwise from the student 107, to whom the printed matter P is distributed, to the other students 107.

Figure 21:
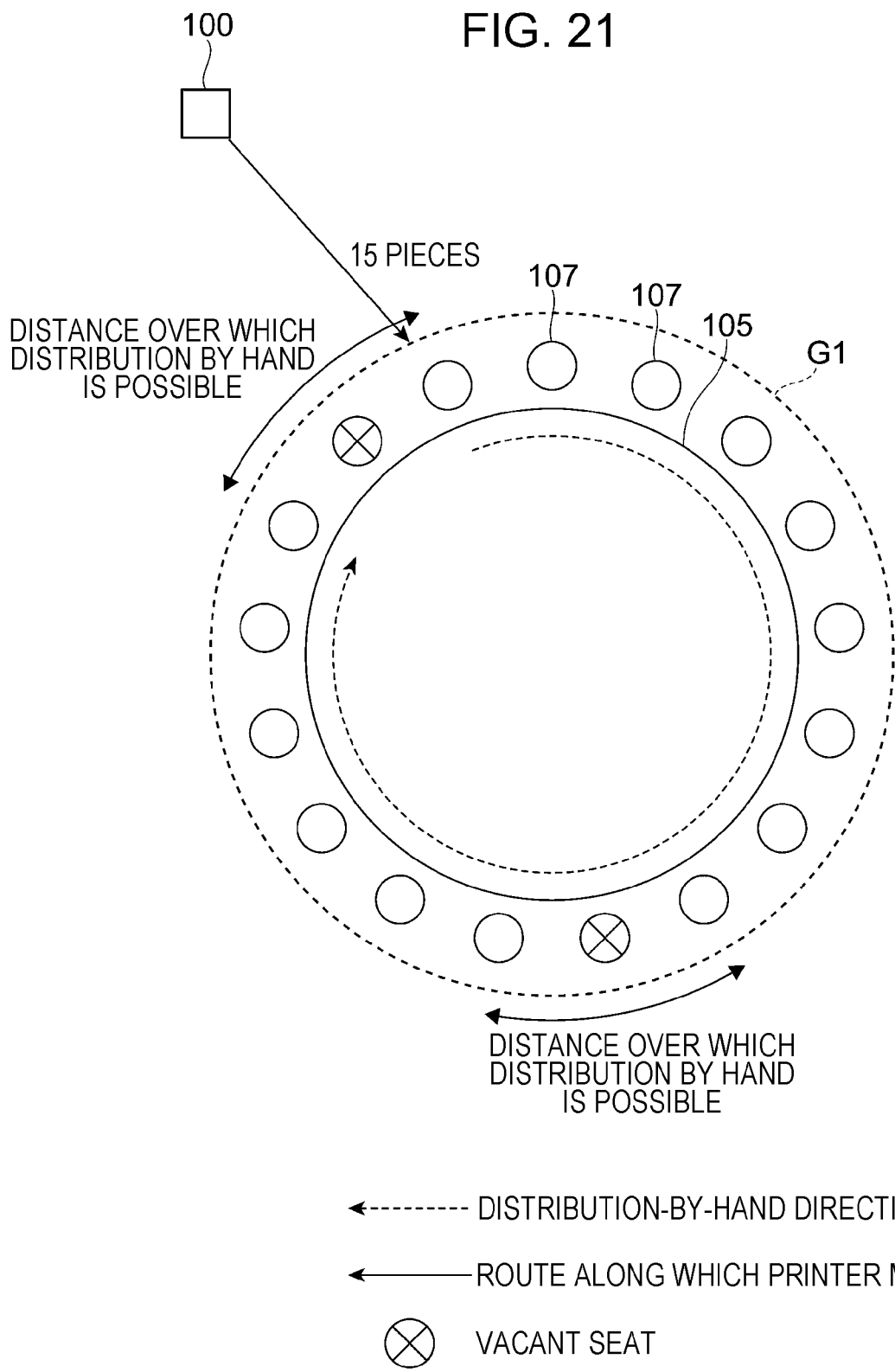
FIG. 21 is a diagram for describing how to handle distribution in the case where two discontinuous vacant seats are present in the example illustrated in FIG. 19.

FIG. 21 is a diagram for describing how to handle distribution in the case where two discontinuous vacant seats are present in the example in FIG. 19.

In FIG. 21, students 107 on both sides of one vacant seat are positioned at a distance over which the printed matter P may be handed over to each other.

Therefore, in the example in FIG. 21, 15 distributed pieces of the printed matter P are handed over sequentially to the other students 107 clockwise in the group G1.

Figure 22:
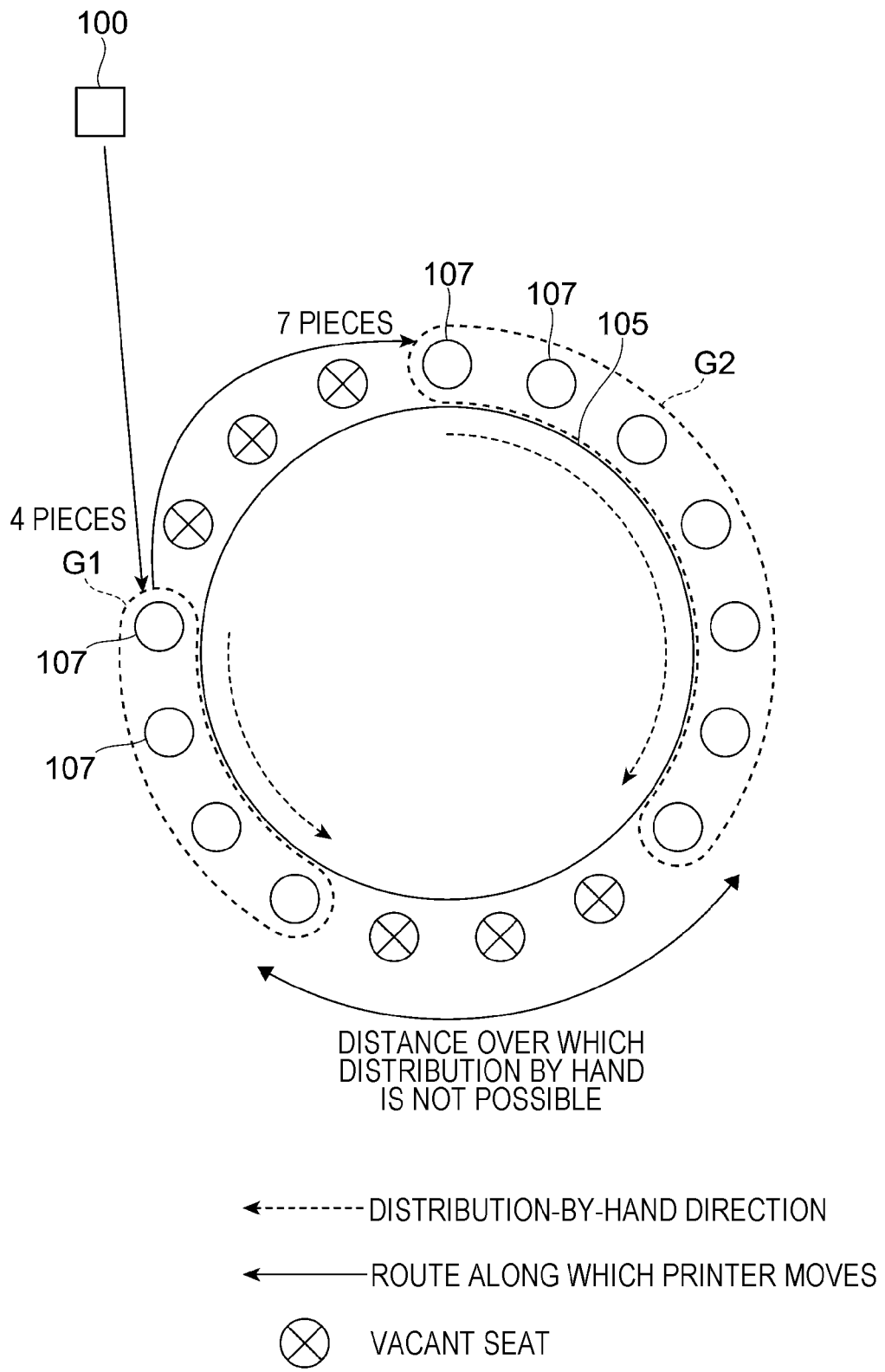
FIG. 22 is a diagram for describing how to handle distribution in the case where three continuous vacant seats appear at two positions in the example illustrated in FIG. 19.

FIG. 22 is a diagram for describing how to handle distribution in the case where three continuous vacant seats appear at two positions in the example in FIG. 19.

When there is one vacant seat, the students 107 on both the sides of the vacant seat may hand the printed matter P over to each other. When there are three continuous vacant seats, it is not possible for the students 107 on both the sides of the vacant seats to hand the printed matter P over to each other.

Therefore, in FIG. 22, the students are divided so that the group G1 has four students and the group G2 has seven students.

In FIG. 22, the printer 100 moves first to the group G1, and distributes four pieces of the printed matter P. Then, the printer 100 moves to the group G2, and distributes seven pieces of the printed matter P.

As illustrated in FIG. 22, the printer 100 which has distributed the printed matter P to the group G1 moves clockwise along the three vacant seats. The movement route is an exemplary route for which the movement distance is shorter.

The printed matter P is handed over to the other students 107 counterclockwise in the group G1, and the printed matter P is handed over to the other students 107 clockwise in the group G2.

Figure 23:
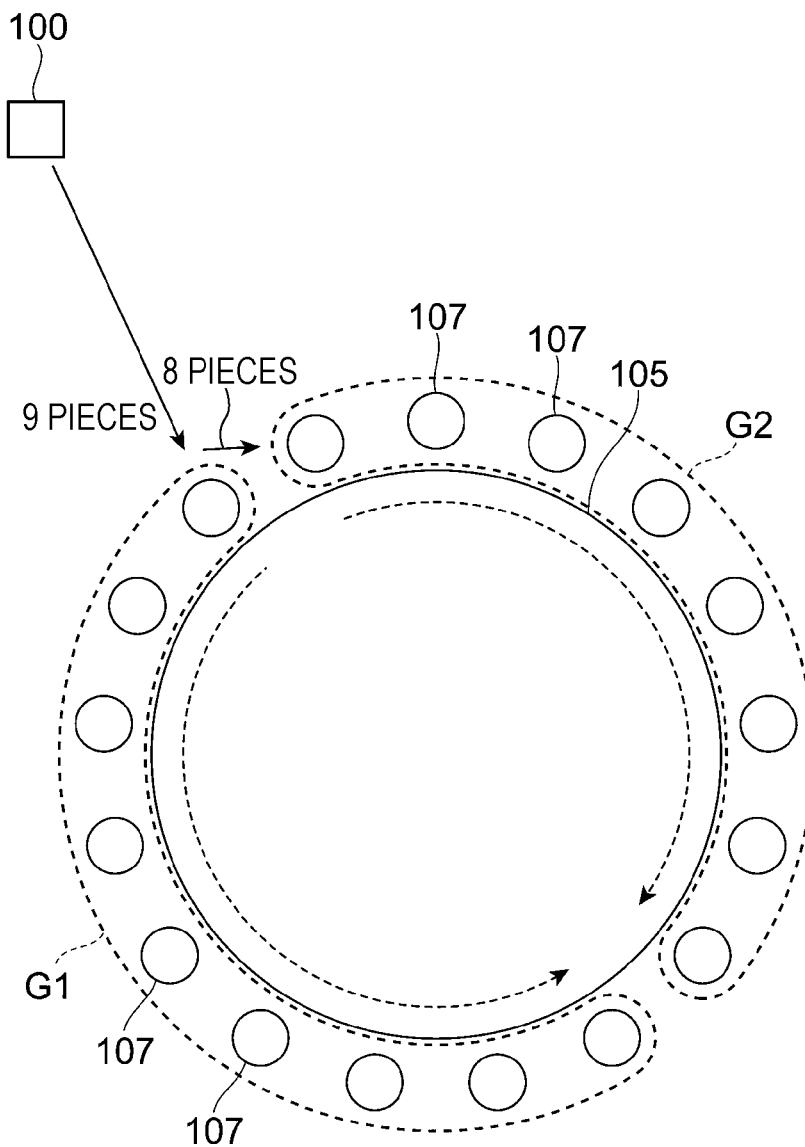
FIG. 23 is a diagram for describing how to handle distribution in the case where two groups are set by applying division rule 2, which is set for division into groups, to the example illustrated in FIG. 19.

FIG. 23 is a diagram for describing how to handle distribution in the case where two groups are set by applying division rule 2, which is set for division into groups, to the example in FIG. 19.

In FIG. 23, the case is assumed in which one group has nine members at the maximum.

Therefore, in FIG. 23, the 17 students 107 arranged along the outer edges of the circular desk 105 are divided into the group G1, which has nine students, and the group G2, which has eight students.

In FIG. 23, the printer 100 moves first to the group G1, and distributes nine pieces of the printed matter P. Then, the printer 100 moves to the group G2, and distributes eight pieces of the printed matter P. In FIG. 23, two students 107 to which the printer 100 distributes the printed matter P are positioned at the border between the group G1 and the group G2 which are set for management. Therefore, the printer 100 moves only a distance of one seat.

When the student 107 positioned at the center of the nine students included in the group G1 is set as the distribution target of the printed matter P, the printer 100 has to move a distance of five seats. Therefore, the movement route in FIG. 23 is an exemplary route for which the movement distance is shorter.

The printed matter P is handed over to the other students 107 counterclockwise in the group G1, and the printed matter P is handed over to the other students 107 clockwise in the group G2.

Fifth Example

Figure 24:
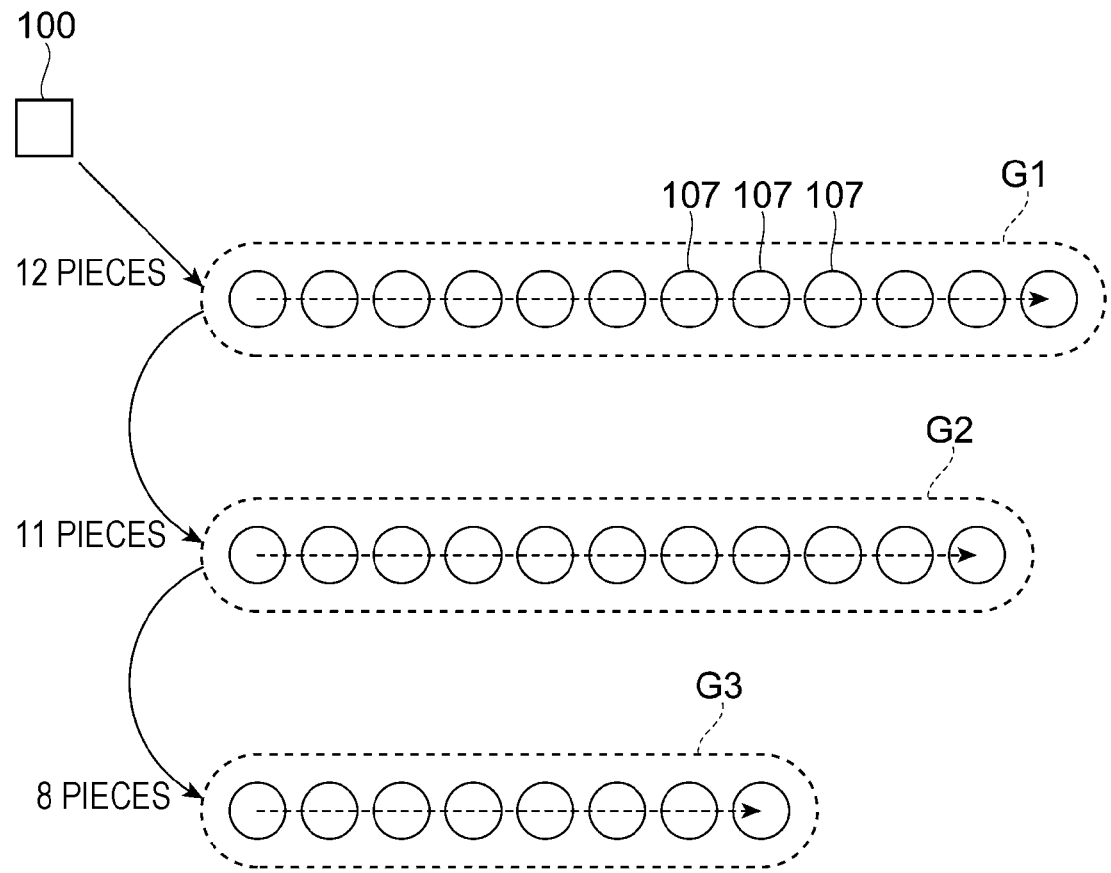
FIG. 24 is a diagram for describing fifth exemplary distribution.

FIG. 24 is a diagram for describing fifth exemplary distribution.

In FIG. 24, 31 students 107 are arranged separately in three rows. Specifically, 12 students 107 are arranged in the first row; 11 students 107, in the second row; and 8 students 107, in the third row.

In FIG. 24, each of the students 107 in the same row is positioned so as to be capable of handing the printed matter P over to the adjacent students 107. Therefore, in FIG. 23, the 12 students in the first row are handled as being included in the group G1; the 11 students in the second row are handled as being included in the group G2; and the 8 students in the third row are handled as being included in the group G3.

In FIG. 24, the printer 100 moves first to the group G1 having the largest number of members, and distributes 12 pieces of the printed matter P. Then, the printer 100 moves to the group G2 having the second largest number of members, and distributes 11 pieces of the printed matter P. Finally, the printer 100 moves to the group G3 having the smallest number of members, and distributes 8 pieces of the printed matter P.

In FIG. 24, the printed matter P is handed over sequentially in one direction in each group.

Figure 25:
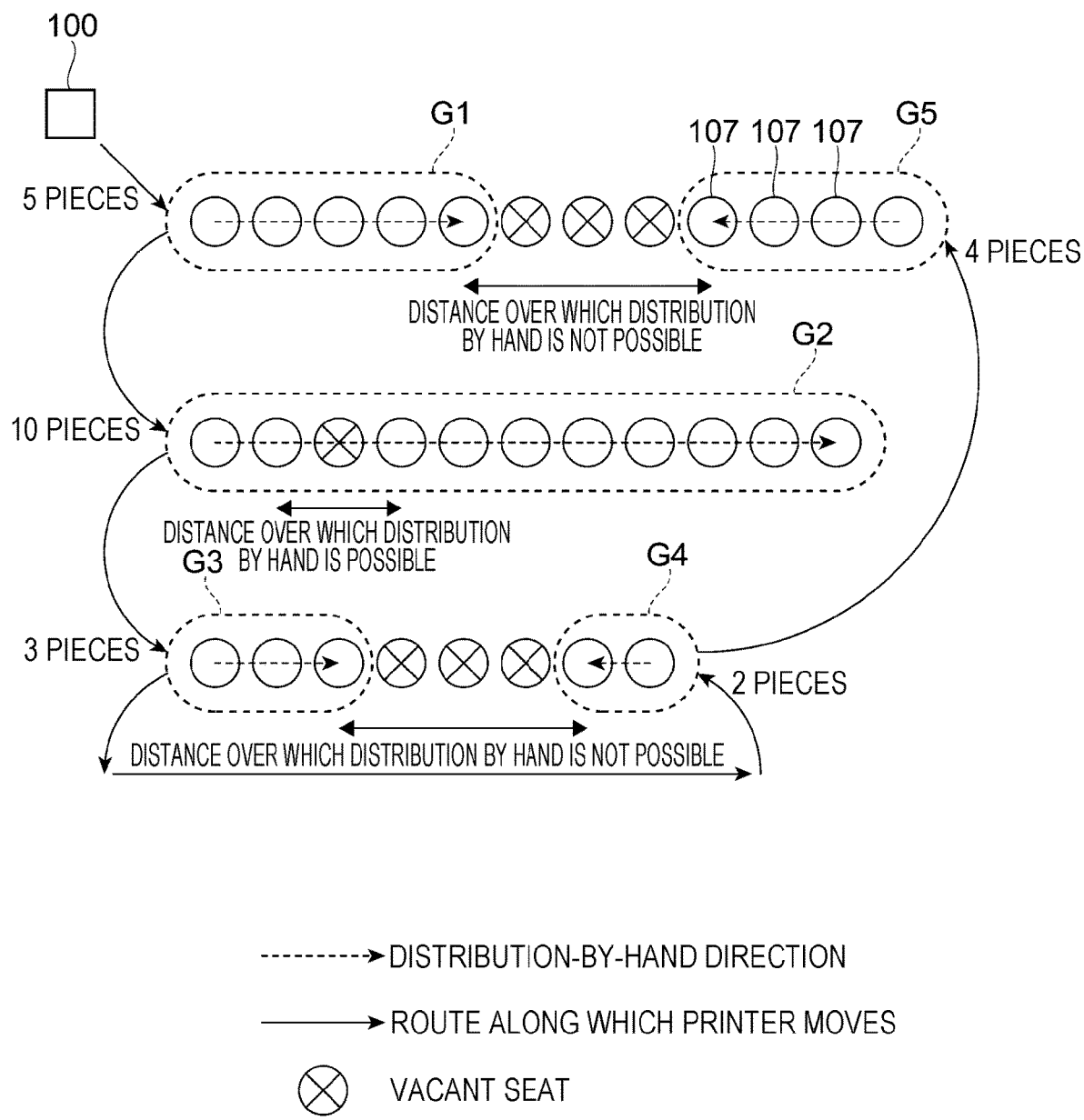
FIG. 25 is a diagram for describing distribution handled in the case where vacant seats over which distribution by hand is impossible are present in the example illustrated in FIG. 24.

FIG. 25 is a diagram for describing distribution handled in the case where there are vacant seats over which distribution by hand is impossible in the example in FIG. 24.

In FIG. 25, three continuous vacant seats appear in the first row and the third row.

When there are three continuous vacant seats, it is impossible for the students 107 on both the sides of the vacant seats to hand the printed matter P to each other. Therefore, the students 107 in the first row are divided into the group G1 and the group G5. The students 107 in the third row are divided into the group G3 and the group G4.

One vacant seat appears in the second row. However, if it is only one vacant seat, the students 107 on both the sides of the vacant seat may hand the printed matter P to each other.

In FIG. 25, the printer 100 distributes five pieces of the printed matter P to the group G1, and then distributes 10 pieces of the printed matter P to the group G2. Subsequently, the printer 100 distributes three pieces of the printed matter P to the group G3, and then distributes two pieces of the printed matter P to the group G4. Finally, the printer 100 distributes four pieces of the printed matter P to the group G5.

Sixth Example

Figure 26:
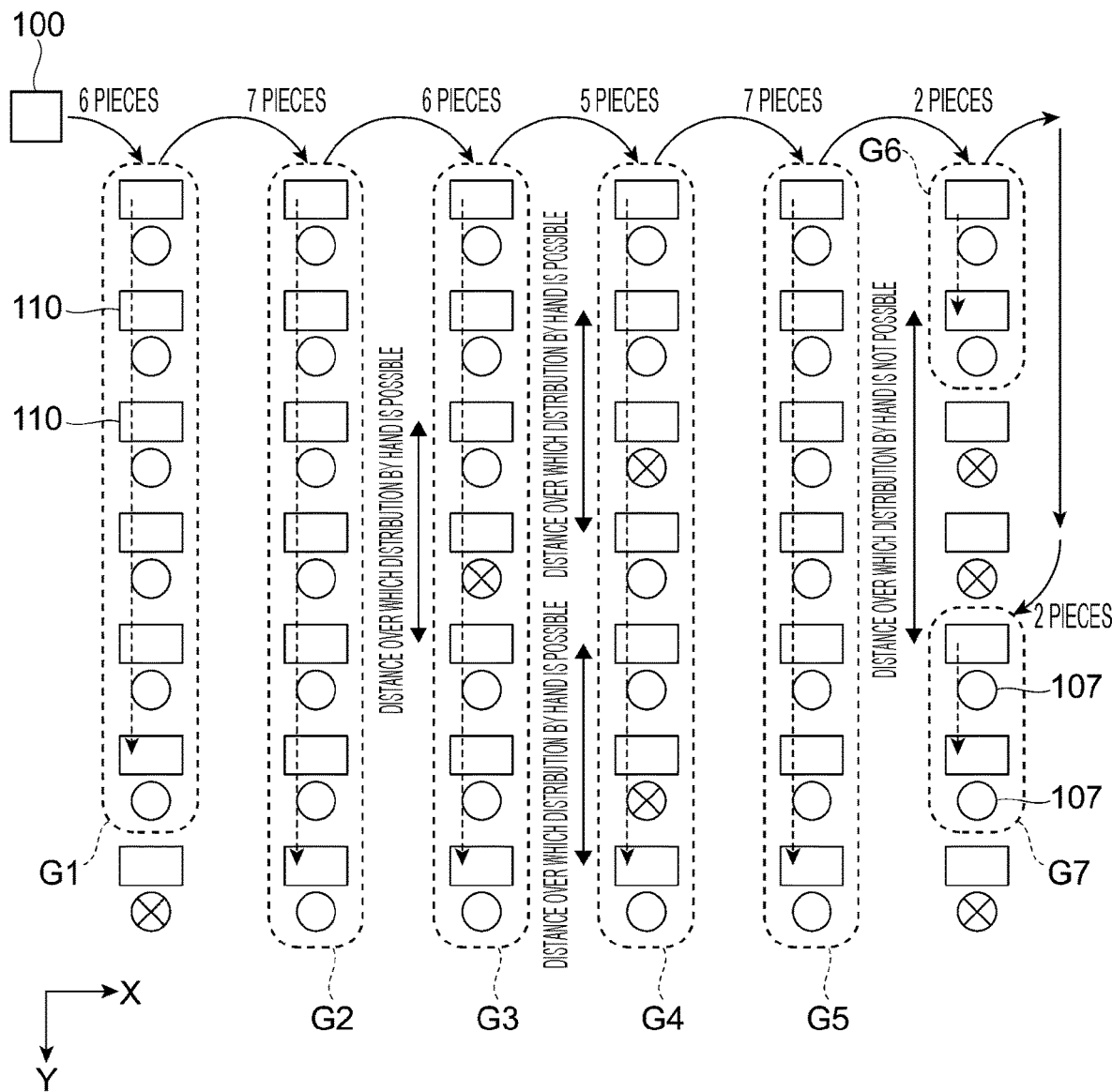
FIG. 26 is a diagram for describing distribution of printed matter P handled in the case where there are seats at which no students are seated.

FIG. 26 is a diagram for describing distribution of the printed matter P handled in the case where there are seats in which no students 107 are seated.

In FIG. 26, desks 105 are arranged in seven rows and six columns.

In FIG. 26, the printed matter P may be handed over a single vacant seat in the column direction (Y direction). However, the printed matter P is not capable of being handed over two continuous vacant seats.

Therefore, the students 107 in the rightmost column in which two continuous vacant seats appear are divided into the two groups G6 and G7.

A vacant seat appears in the other columns, but two continuous vacant seats are not present. Therefore, in FIG. 26, the groups G1, G2, G3, G4, and G5 are set for the respective columns from the left to the right.

In FIG. 26, the printer 100 moves from the initial position to the group G1, and distributes six pieces of the printed matter P. Then, the printer 100 moves to the next right group G2, and distributes seven pieces of the printed matter P. Then, the printer 100 moves to the next right group G3, and distributes six pieces of the printed matter P. Then, the printer 100 moves to the next right group G4, and distributes five pieces of the printed matter P. Then, the printer 100 moves to the next right group G5, and distributes seven pieces of the printed matter P. Then, the printer 100 moves to the next right group G6, and distributes two pieces of the printed matter P. Then, the printer 100 moves to the group G7 in the same column, and distributes two pieces of the printed matter P.

In FIG. 26, the printer 100 may move along the left end in FIG. 26 in the column direction, and may distribute the printed matter P to groups which are set for the respective rows.

Seventh Example

How to distribute the printed matter P in each group will be described below.

Figure 27A:
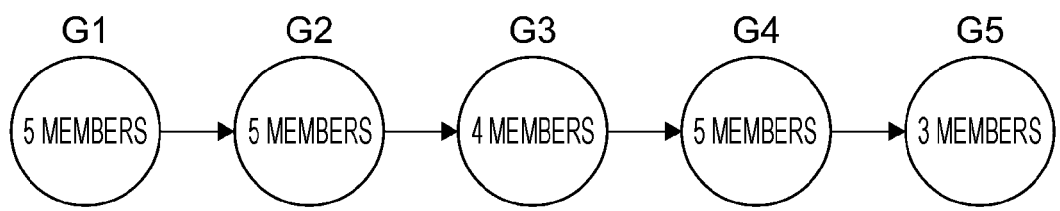
FIG. 27A is a diagram which describes a first case in which printed matter P is sorted in advance in accordance with the order of moves to groups and which illustrates the relationship between each group appearing in the order of moves and the number of members in the group.
Figure 27B:
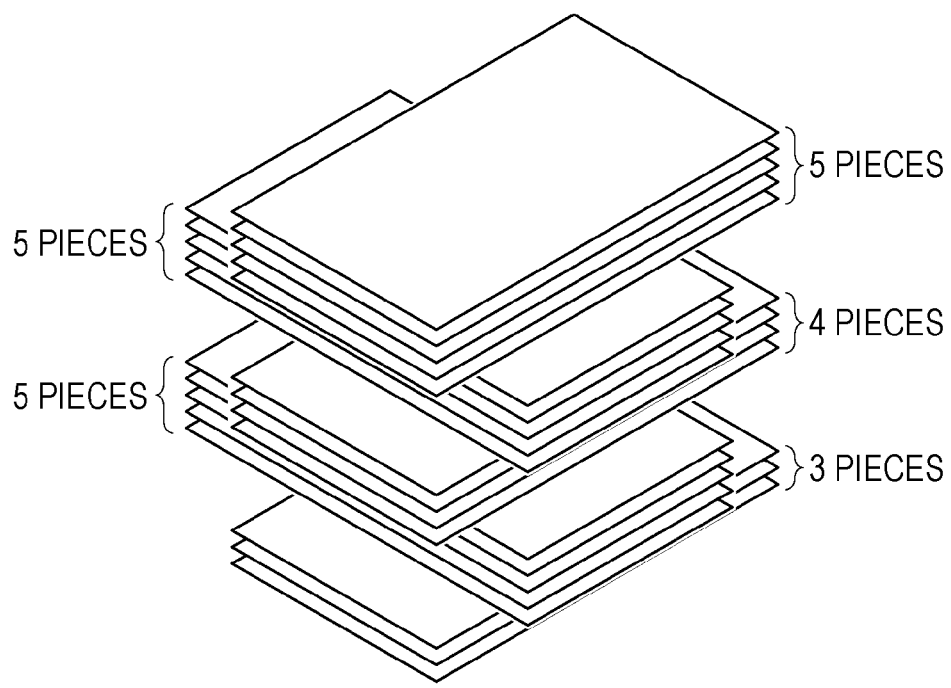
FIG. 27B is a diagram which describes the first case and which illustrates an exemplary sorting process performed by a printer.

FIGS. 27A and 27B are diagrams for describing the case in which the printed matter P is sorted in advance in accordance with the order of moves to groups. FIG. 27A illustrates the relationship between each of the groups appearing in the order of moves and the number of members in the group. FIG. 27B illustrates an exemplary sorting process performed by the printer 100.

In FIGS. 27A and 27B, there are five groups.

The groups G1, G2, and G4 each have five members; the group G3 has four members; and the group G5 has three members.

In the case of FIGS. 27A and 27B, the order of moves is as follows: the group G1, the group G2, the group G3, the group G4, and the group G5.

In FIGS. 27A and 27B, in the stage in which the groups and the order of moves to the groups are determined, the printed matter P is sorted. For example, the sorting mechanism 122 (see FIG. 2) is used for the sorting.

In FIGS. 27A and 27B, in consideration of reception of the printed matter P in every group, the printed matter P is sorted in accordance with the number of members in each group.

At that time, the printed matter P is stacked such that a stack of a corresponding pieces of the printed matter P for a group, to which the printer 100 moves earlier in the order of moves, is located at an upper position.

In the example in FIGS. 27A and 27B, a stack of three pieces of the printed matter P which corresponds to the group G5, to which the printer 100 moves last in the order of moves, is positioned at the bottom. On top of this, a stack of five pieces of the printed matter P which corresponds to the group G4, to which the printer 100 moves next to last, is stacked so as to be oriented in a direction different from that of the lower stack. Similarly, a stack of four pieces of the printed matter P which corresponds to the group G3 is stacked so as to be oriented in a direction different from that of the next lower stack. On top of this, a stack of five pieces of the printed matter P which corresponds to the group G2 is stacked so as to be oriented in a direction different from that of the next lower stack. At the top, a stack of five pieces of the printed matter P which corresponds to the group G1 is stacked so as to be oriented in a direction different from that of the next lower stack.

Therefore, a member in each group may receive pieces of the printed matter P that are to be handed over in their group, efficiently and without error.

Figure 28A:
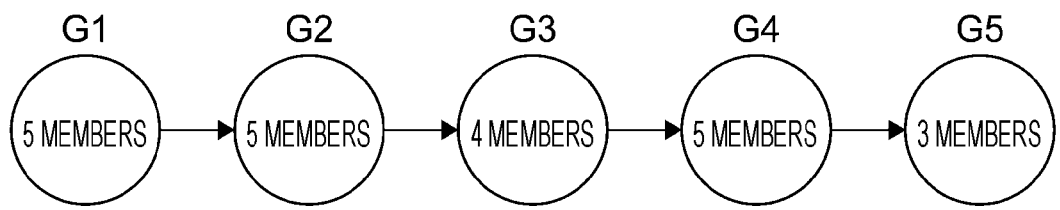
FIG. 28A is a diagram which describes a second case in which printed matter P is sorted in advance in accordance with the order of moves to groups and which illustrates the relationship between each group appearing in the order of moves and the number of members of the group.
Figure 28B:
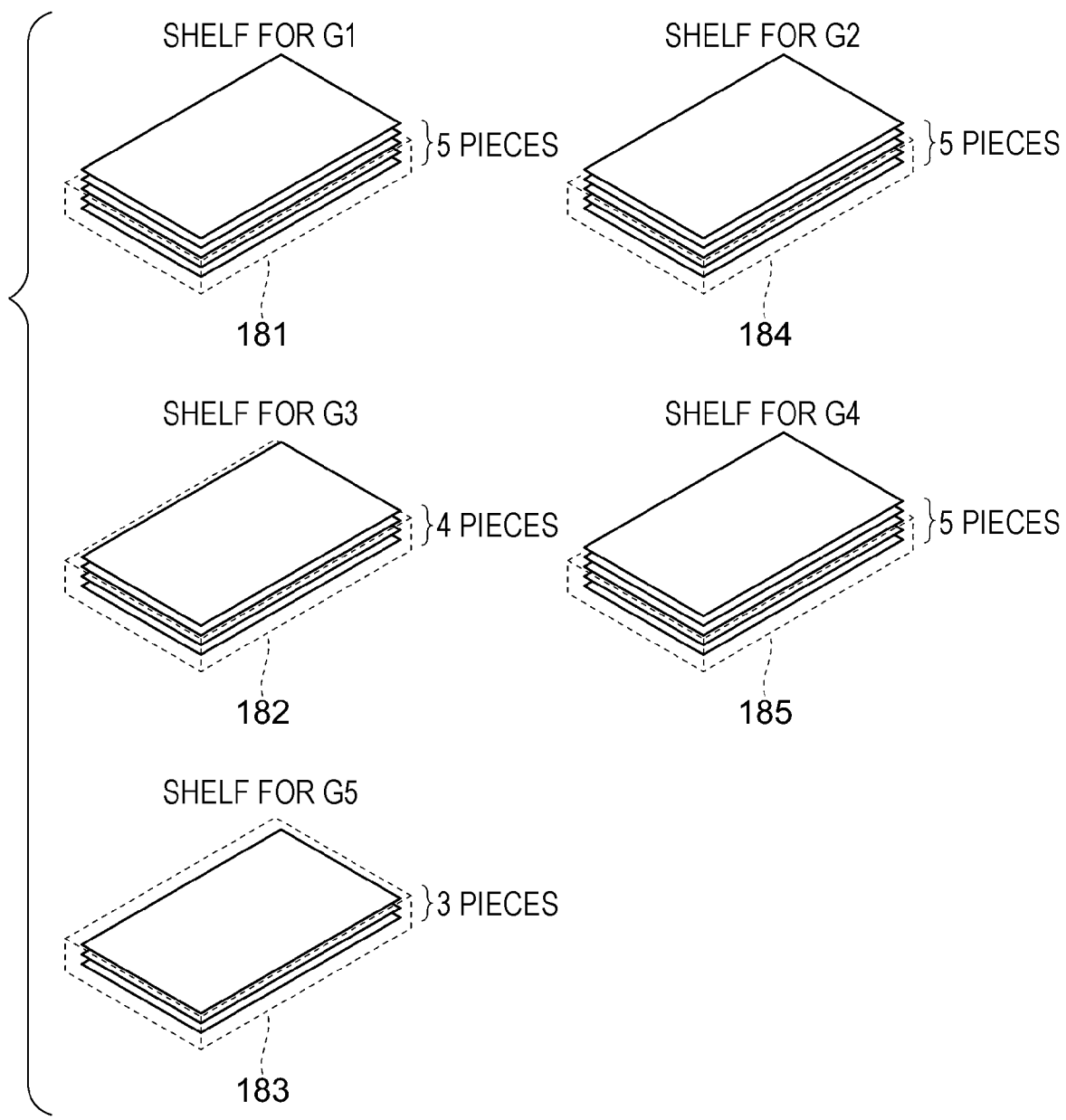
FIG. 28B is a diagram which describes the second case and which illustrates an exemplary sorting process performed by a printer.

FIGS. 28A and 28B are diagrams for describing another case in which the printed matter P is sorted in advance in accordance with the order of moves to groups. FIG. 28A illustrates the relationship between each group appearing in the order of moves and the number of members in the group. FIG. 28B illustrates an exemplary sorting process performed by the printer 100.

In FIGS. 27A and 27B, the printed matter P is sorted in accordance with the order of moves, and the stacks obtained through sorting are stacked on top of one another. In FIGS. 28A and 28B, shelves 181 to 185 are prepared for the respective groups. Shelves, in which the printed matter P is accommodated after being sorted, more than the assumed number of groups are prepared.

In FIGS. 28A and 28B, the shelf 181 for the group G1 accommodates five pieces of the printed matter P. The shelf 182 for the group G3 accommodates four pieces of the printed matter P. The shelf 183 for the group G5 accommodates three pieces of the printed matter P. The shelf 184 for the group G2 accommodates five pieces of the printed matter P. The shelf 185 for the group G4 accommodates five pieces of the printed matter P.

As in the case of FIGS. 28A and 28B, when the shelves 181 to 185 are prepared for the respective groups, a member in each group needs to know which shelf is for their group.

That is, in this example, a mechanism of giving information describing from which shelf pieces of the printed matter P are to be extracted is employed.

For example, the display unit 118 (see FIG. 2) or the speaker 120 (see FIG. 2) is used to give information describing from which shelf pieces of the printed matter P are to be extracted.

Alternatively, for example, information about the extraction target is given by lighting a lamp or the like provided for a shelf or by changing the emitting color to green.

Alternatively, for example, information about the extraction target is given by moving only the target shelf to a position at which a distribution target easily receives the printed matter P compared with the other shelves. For example, the shelf corresponding to the group is moved so as to be pulled out relative to the shelves corresponding to the other groups.

Eighth Example

In the examples described above, the case in which the printed matter P is printed before start of a move for distribution is described. In this example, the case in which, after start of a move, a necessary number of pieces of the printed matter P are printed at a time will be described.

In the system in which all pieces of the printed matter P are printed before a move, a wrong number of pieces of the printed matter P may be extracted. In addition, when printed matters of different information depending on the groups are to be distributed, a mechanism which inhibits an error in extraction is required.

FIG. 29 is a flowchart of an exemplary process of printing a necessary number of pieces of the printed matter P for each group at a time.

The process in FIG. 29 is implemented by the CPU 111 (see FIG. 2) executing programs.

The CPU 111 obtains the position of the printer 100 (step 201). To obtain the position of the printer 100, for example, the functions of the current-position acquiring unit 135 (see FIG. 3) are used.

When the position of the printer 100 is obtained, the CPU 111 detects a group at which the printer 100 is positioned, with reference to information about the movement route and the like (step 202).

Then, the CPU 111 determines whether or not the printed matter P has been handed over (step 203). Whether the printed matter P has been handed over is detected, for example, by using an operation which indicates completion of extraction and which is performed by a member of the group. Alternatively, for example, a reduction in the weight of the printed matter accommodated in the apparatus body 101 (see FIG. 1), or an output from a sensor detecting presence/absence of the printed matter may be used.

While a negative result is obtained in step 203, the CPU 111 performs the determination.

In contrast, if a positive result is obtained in step 203, the CPU 111 determines whether or not there is a group to which the printer 100 moves next (step 204).

If a negative result is obtained in step 204, the CPU 111 ends the process.

In contrast, if a positive result is obtained in step 204, the CPU 111 determines whether or not a move to the next group has been started (step 205).

While a negative result is obtained in step 205, the CPU 111 performs the determination.

In contrast, if a positive result is obtained in step 205, the CPU 111 starts printing pieces of the printed matter P that are to be distributed to the next group (step 206).

That is, in this example, after a move to the next group is started, pieces of the printed matter P that are to be distributed to the next group are printed.

Employment of this mechanism allows a member of each group to extract only pieces of the printed matter P for their group from the apparatus body 101.

Thus, the state in which a wrong number of pieces of the printed matter P are extracted from the apparatus body 101 may be inhibited.

Even when information on the printed matter P to be distributed is different depending on each group, the information may be inhibited from being known by members of the other groups.

In the description in FIG. 29, printing of the printed matter P is started under the condition of start of a move. Alternatively, completion of reception of printed matter P may be used as the condition.

Figure 30:
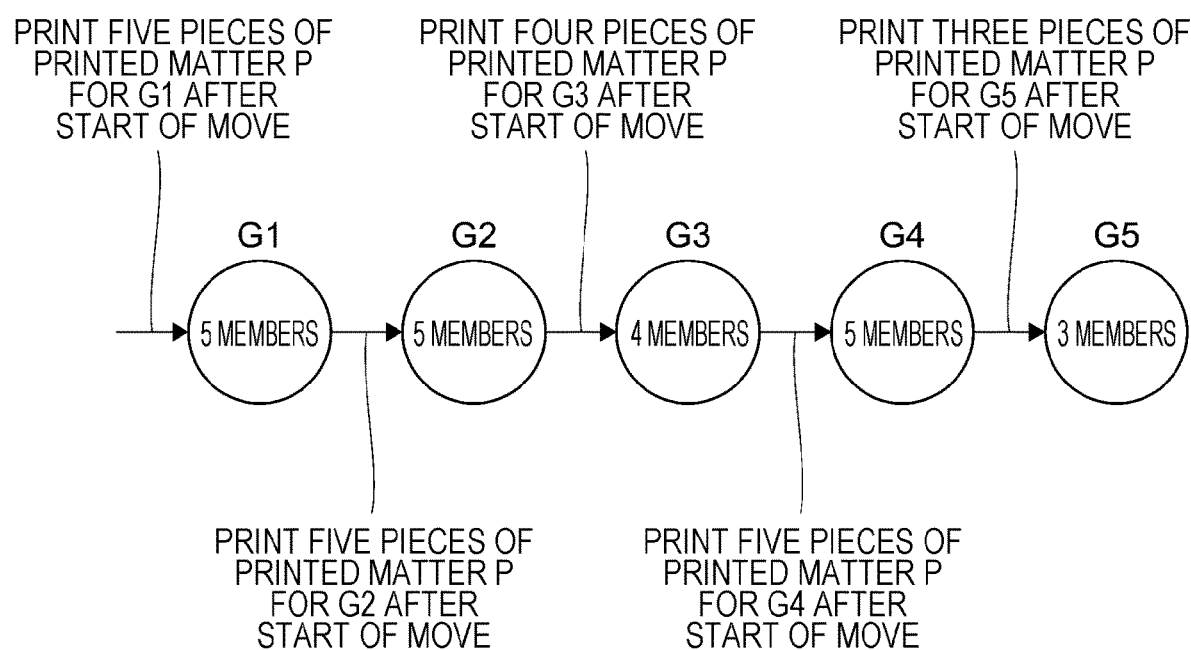
FIG. 30 is a diagram for describing a state of printing necessary pieces of printed matter P for each group.

FIG. 30 is a diagram for describing a state of the process of printing a necessary number of pieces of the printed matter P for each group at a time.

In FIG. 30, after start of a move from the initial position, the printer 100 (see FIG. 1) prints five pieces of the printed matter P for the group G1.

Then, after start of a move from the group G1, the printer 100 prints five pieces of the printed matter P for the group G2.

Similarly, after start of a move from the group G2, the printer 100 prints four pieces of the printed matter P for the group G3. After start of a move from the group G3, the printer 100 prints five pieces of the printed matter P for the group G4. After start of a move from the group G4, the printer 100 prints three pieces of the printed matter P for the group G5.

Ninth Example

In the examples described above, it is assumed that a member of each group knows the number of pieces of the printed matter P received from the printer 100, and a route along which the received pieces of the printed matter P are to be handed over. However, the member does not necessarily know the other members in their group.

In this example, a mechanism of assisting a member of each group who receives the printed matter P will be described.

Figure 31:
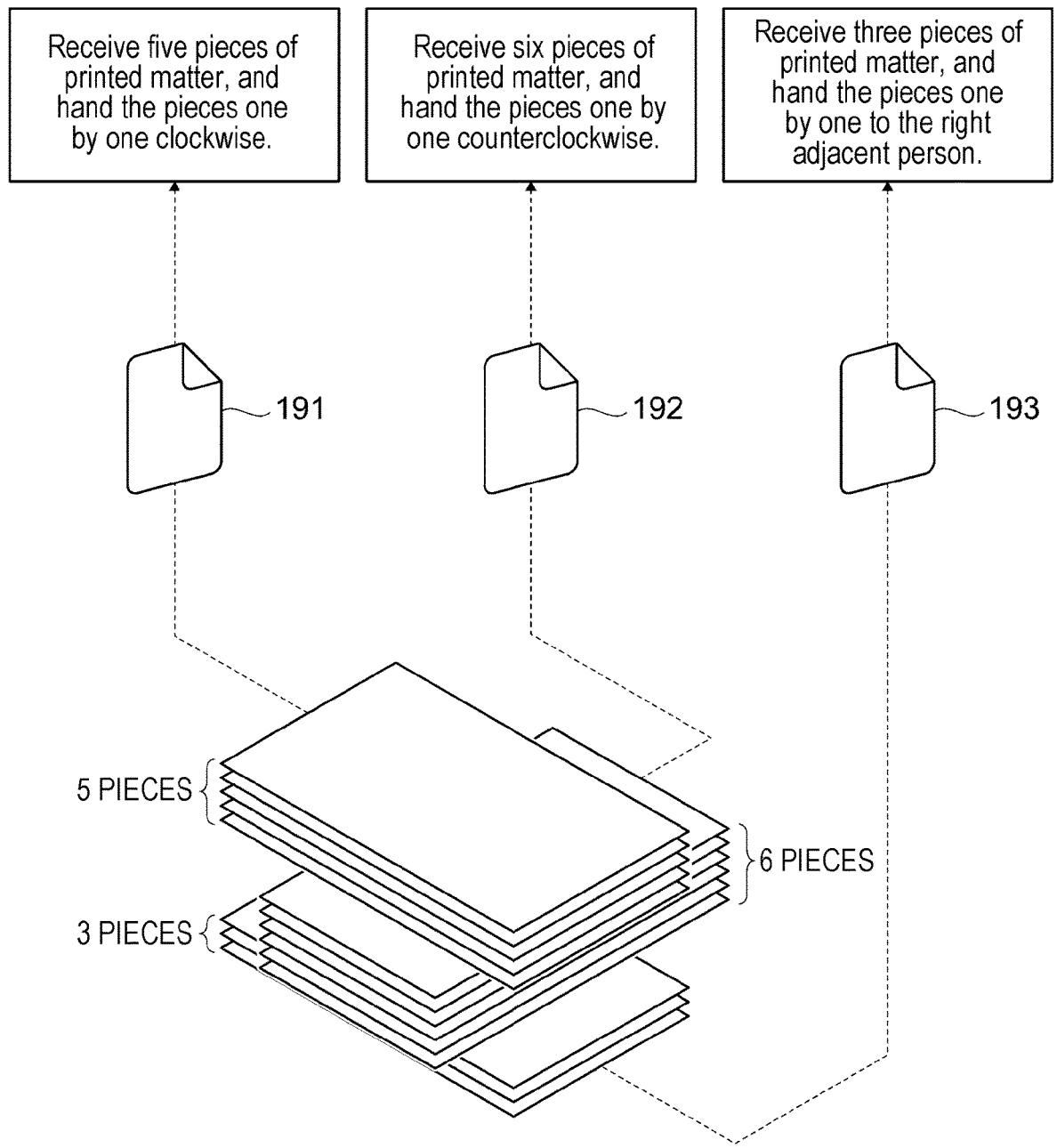
FIG. 31 is a diagram for describing a first exemplary mechanism of assisting in reception of printed matter P.

FIG. 31 is a diagram for describing an exemplary mechanism of assisting in reception of the printed matter P.

In FIG. 31, sheets 191 to 193 on which explanations for members are printed are prepared for the respective groups that are distribution destinations.

For example, the sheet 191 is put on the top of a stack of the printed matter P that is to be distributed.

On the sheet 191, "Receive five pieces of printed matter, and hand the pieces one by one clockwise." is described. Therefore, a member of the first group may know the number of pieces that are to be received, and the direction in which the pieces of printed matter are to be handed over.

In FIG. 31, the sheet 192 on which an explanation for the next group is printed is inserted between stacks of the printed matter P.

On the sheet 192, "Receive six pieces of printed matter, and hand the pieces one by one counterclockwise." is described.

When the previous group receives the printed matter P, the sheet 192 may be erroneously taken. Therefore, the sheet 192 may be printed during a move to the next group, and may be output on the top of the stacks of the printed matter P.

Similarly, on the sheet 193, "Receive three pieces of printed matter, and hand the pieces one by one to the right adjacent person." is described.

As described above, an explanation facilitates reception of the printed matter P performed by a member.

Figure 32A:
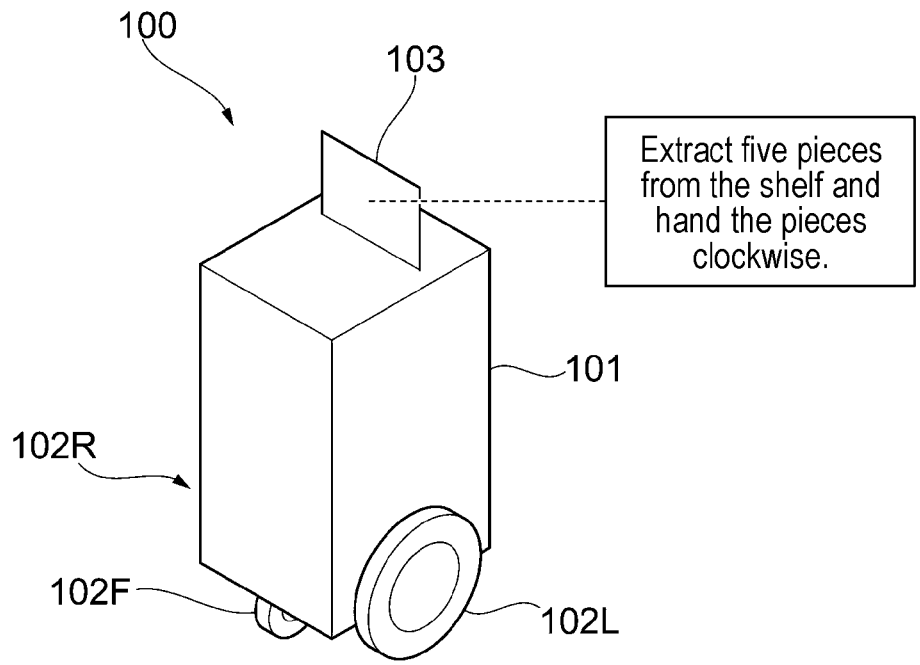
FIG. 32A is a diagram which describes a second exemplary mechanism of assisting in reception of printed matter P and which illustrates an example using a user interface provided on a piece of printed matter.
Figure 32B:
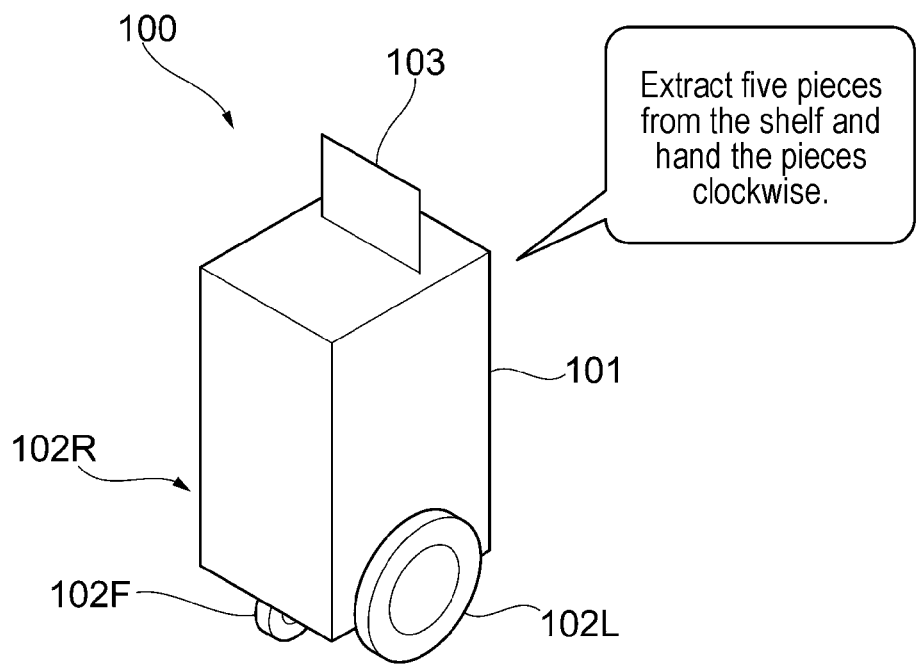
FIG. 32B is a diagram which describes the second exemplary mechanism and which illustrates an example using voice.

FIGS. 32A and 32B are diagrams for describing another exemplary mechanism of assisting in reception of the printed matter P. FIG. 32A illustrates an example using the user interface 103 provided for the printer 100. FIG. 32B illustrates an example using voice.

In FIG. 32A, an explanation is displayed on the display unit 118 (see FIG. 2) which is a part of the user interface 103. On the display unit 118, the position, in the spatial layout, of the group including the member receiving the printed matter P may be displayed by using a figure. The display as a figure facilitates understanding of the group including the member.

In the example in FIG. 32A, an explanation, "Extract five pieces from the shelf and hand the pieces clockwise," is displayed.

In FIG. 32B, voice, "Extract five pieces from the shelf and hand the pieces clockwise," is output from the speaker 120 (see FIG. 2) which is not illustrated. The notification using voice helps the other members in understanding easily how to handle the distribution.

Second Exemplary Embodiment

Figure 33:
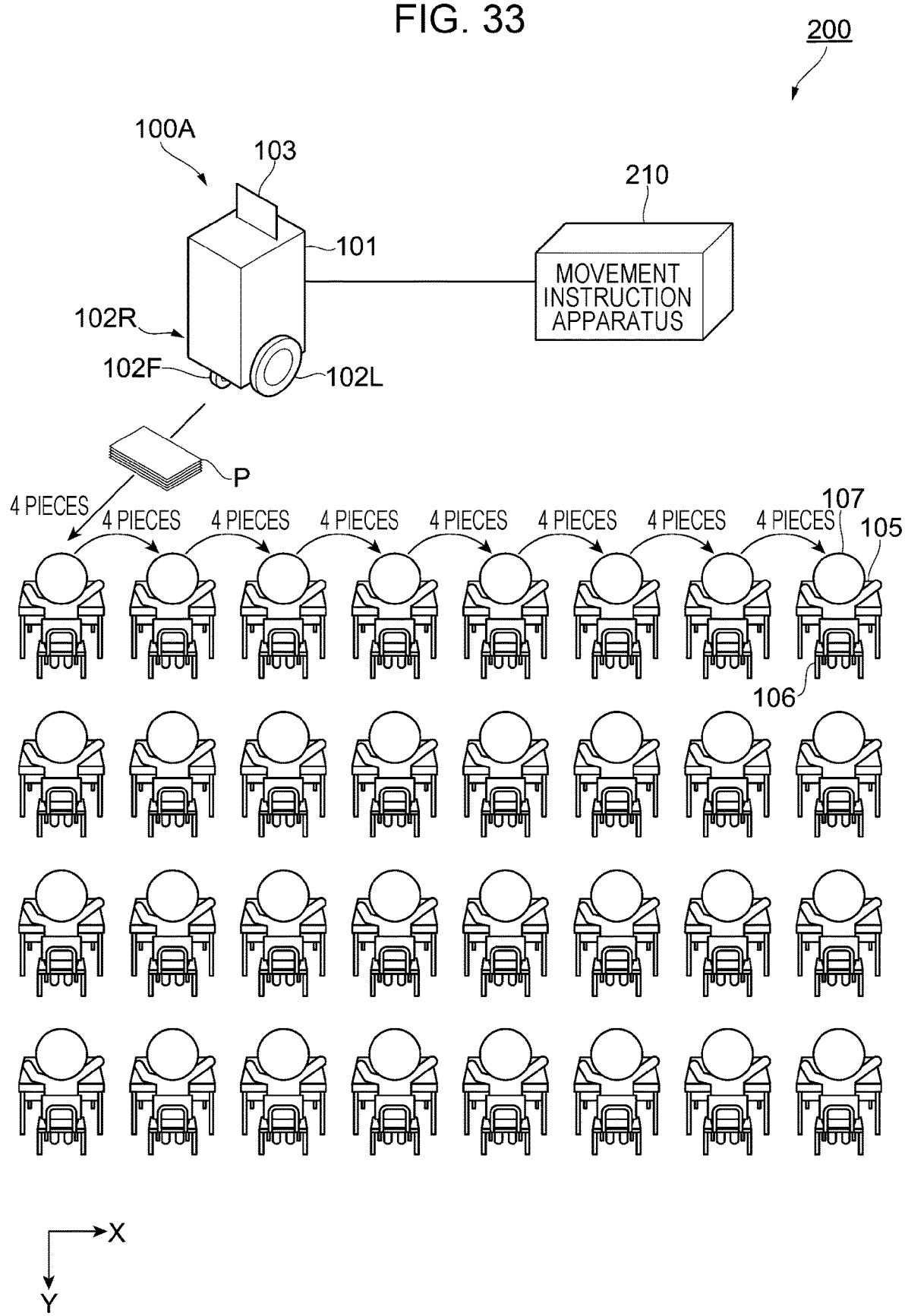
FIG. 33 is a diagram for describing a configuration example of a mobile-distribution system which includes a self-propelled printer and a movement instruction apparatus and which is used in a second exemplary embodiment.

FIG. 33 is a diagram for describing a configuration example of a mobile-distribution system 200 including a self-propelled printer 100A and a movement instruction apparatus 210 which are used in a second exemplary embodiment.

The mobile-distribution system 200 is an exemplary distribution material providing system. The movement instruction apparatus 210 is an exemplary instruction apparatus. The self-propelled printer 100A is an exemplary providing apparatus.

In the second exemplary embodiment, the movement instruction apparatus 210 is provided with the functions of setting groups and setting a route. The printer 100A is provided with the other functions.

In FIG. 33, the printer 100A moves sequentially to the columns in the X direction according to an instruction from the movement instruction apparatus 210, and distributes four pieces of the printed matter P to a student 107 in each column.

Figure 34:
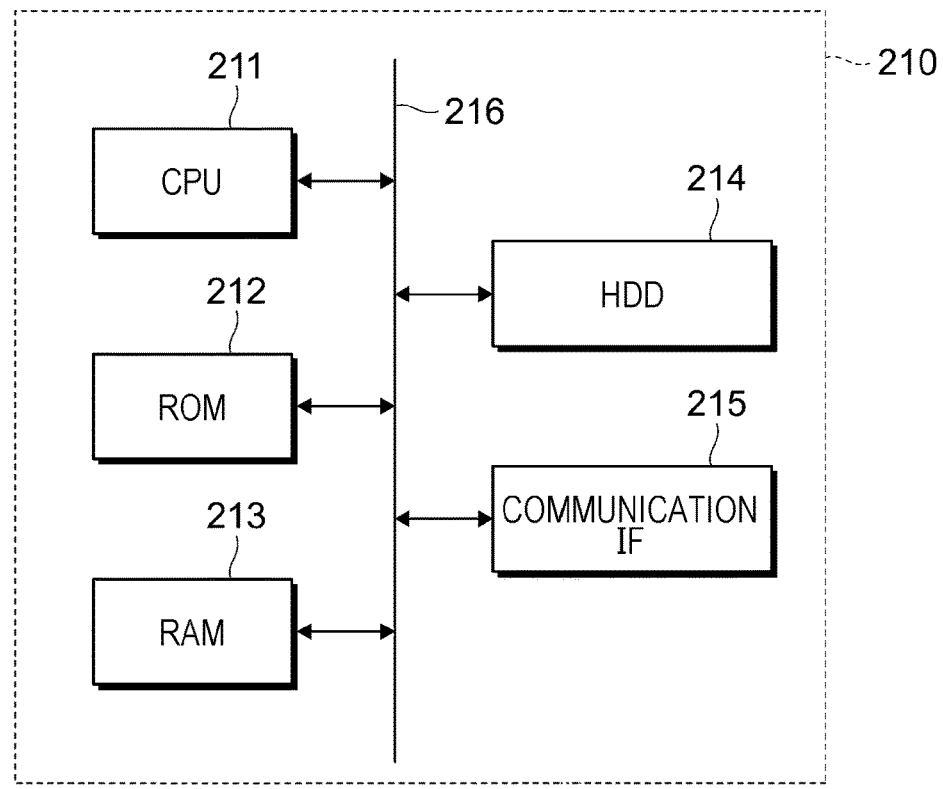
FIG. 34 is a diagram illustrating a hardware configuration example of a movement instruction apparatus used in the second exemplary embodiment.

FIG. 34 is a diagram illustrating a hardware configuration example of the movement instruction apparatus 210 used in the second exemplary embodiment.

The movement instruction apparatus 210 includes a CPU 211 that controls the entire apparatus through execution of programs (including firmware), a ROM 212 used to store programs, such as a BIOS and firmware, and a RAM 213 used as an execution area for programs.

The CPU 211, the ROM 212, and the RAM 213 function as a computer.

The movement instruction apparatus 210 also includes an HDD 214 and a communication IF 215. The HDD 214 stores image data, management data, and the like. The communication IF 215 is used in communication with the printer 100A and the like. These units are connected to each other through a bus 216 through which data is transferred.

The hardware configuration of the printer 100A is the same as that of the printer 100 (see FIG. 2) according to the first exemplary embodiment. Therefore, the hardware configuration of the printer 100A will not be described.

Figure 35:
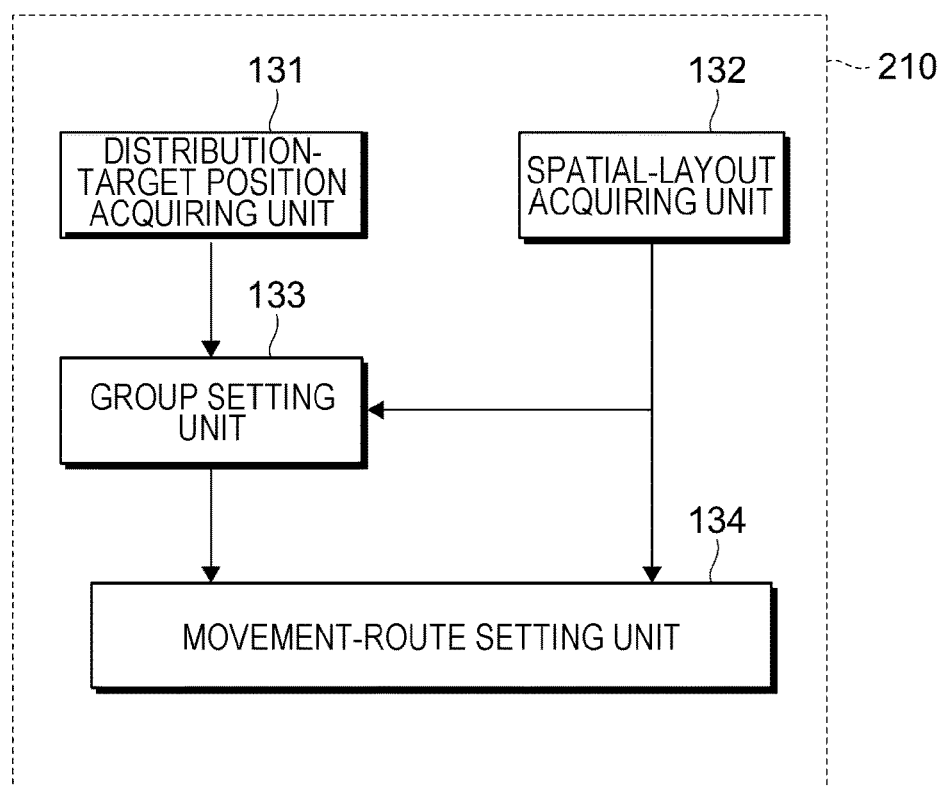
FIG. 35 is a diagram illustrating an exemplary functional configuration of a movement instruction apparatus.

FIG. 35 is a diagram illustrating an exemplary functional configuration of the movement instruction apparatus 210.

In FIG. 35, components corresponding to those in FIG. 3 are designated with corresponding reference numerals.

In the second exemplary embodiment, the movement instruction apparatus 210 includes extracted functions, that is, the distribution-target position acquiring unit 131, the spatial-layout acquiring unit 132, the group setting unit 133, and the movement-route setting unit 134. The distribution-target position acquiring unit 131 acquires the positions of distribution targets of the printed matter P. The spatial-layout acquiring unit 132 acquires the layout information of the space in which the distribution targets are positioned. The group setting unit 133 divides the distribution targets into groups having multiple members. The movement-route setting unit 134 sets a route for distributing the printed matter P to each group.

The movement instruction apparatus 210 according to the second exemplary embodiment notifies the printer 100A of information about the groups, which have been set, and the movement route, and controls operations of the printer 100A.

In contrast, the printer 100A according to the second exemplary embodiment performs the functions of the current-position acquiring unit 135, the movement controller 136, the printing controller 137, the notification controller 138, and the sorting controller 139 described in FIG. 3. The current-position acquiring unit 135 acquires the current position of the printer 100A. The movement controller 136 controls moves of the printer 100A. The printing controller 137 controls printing. The notification controller 138 controls notification to distribution targets. The sorting controller 139 controls sorting of the printed matter P.

In the second exemplary embodiment, also when the movement instruction apparatus 210 performs some of the functions performed by the printer 100 (see FIG. 1) according to the first exemplary embodiment, distribution similar to that of the first exemplary embodiment is implemented.

Other Embodiments

The exemplary embodiments of the present disclosure are described above. However, the technical scope of the present disclosure is not limited to the scope described in the above-described exemplary embodiments. It is clear, from the claims, that embodiments obtained by adding various changes and improvements to the above-described exemplary embodiments are also encompassed in the technical scope of the present disclosure.

For example, the printer 100 (see FIG. 1) used in the above-described exemplary embodiment may be provided with a scan function of reading an image from a document, and a function for facsimile (FAX) communication.

In the above-described exemplary embodiment, the self-propelled printer 100 includes a mechanism of printing the printed matter P. Alternatively, the printer 100 may be used for distribution of the printed matter P printed by using another printer. That is, the printer 100 may be an apparatus dedicated to distribution. The apparatus dedicated to distribution is an exemplary mobile apparatus.

In addition, the distribution material is not necessarily printed matter. For example, the distribution material may be food (such as drink, sweets, fruit, and meals), or may be sundries or small goods.

In the above-described exemplary embodiments, the case in which a distribution target is a student 107 is described. As a matter of course, a distribution target is not limited to a student 107.

In addition, a distribution target is not necessarily seated in a chair 106. That is, a distribution target may stand.

In addition, the space in which distribution material is distributed may be indoor or outdoor.

In the above-described exemplary embodiments, there are no persons who do not belong to any group. In the case where there is an isolated person who does not belong to any group, a route may be set so that the printer 100 moves to the isolated person.

In addition, in the above-described exemplary embodiment, the case in which the printer 100 which is an exemplary mobile apparatus is not capable of moving over the step 163 (FIGS. 5A and 5B) is described. Depending on the type of the self-propelling mechanism 121 (see FIG. 2), the printer 100 may move over the step 163. The mobile apparatus may move along a slope.

In the above-described exemplary embodiment, the following example (see FIG. 15) is described as an exemplary process that is to be performed: distribution targets are divided into groups (step 103); a route along which the printer 100 moves from one group to another is then set (step 104); and distribution of the printed matter P is then started (step 105). Alternatively, after a movement route is set, the setting of groups may be determined again on the basis of the movement route which has been set.

Specifically, for example, as in FIG. 11B, after a route bypassing the obstacle 171 is set, the setting of groups may be determined again so that the movement distance of the printer 100 is made shorter. Thus, the five groups are set for the respective rows as in FIG. 9B.

What is claimed is:

1. A mobile apparatus comprising:
    a processor that sets a plurality of groups each having a plurality of members, wherein, when the plurality of members are connected by using a plurality of straight lines, all of the plurality of members are positioned so as to be connected by a plurality of straight lines, wherein a length of each of the plurality of straight lines is equal to or shorter than a predetermined threshold, and wherein each of the plurality of straight lines connects one member of the plurality of members and one other member of the plurality of members; and
    a self-propelling mechanism that moves to any one member of each of the plurality of groups and provides distribution material for the group to the any one member.

2. The mobile apparatus according to claim 1, wherein the processor is further configured to:
    acquire positional information of persons in a specific space, wherein the processor sets the plurality of groups on a basis of the positional information.

3. The mobile apparatus according to claim 2, wherein, when a person who does not belong to the plurality of groups is present in the specific space, the self-propelling mechanism moves to the person who does not belong to the plurality of groups, and provides the distribution material.

4. The mobile apparatus according to claim 1, wherein the processor sets the plurality of groups in such a manner that the plurality of groups each have a predetermined number of members or fewer.

5. The mobile apparatus according to claim 1, wherein the processor sets the plurality of groups in such a manner that a predetermined number of pieces of distribution material or fewer are distributed in each of the plurality of groups.

6. The mobile apparatus according to claim 1, wherein the processor is further configured to:
acquire layout information of the space in which the mobile apparatus moves,
wherein the processor sets the plurality of groups on a basis of the acquired layout information in such a manner that the plurality of groups each include at least one member who is positioned on a route along which the mobile apparatus is capable of moving.

7. The mobile apparatus according to claim 1, wherein the processor is further configured to:
acquire layout information of a space in which the plurality of groups are set; and
set a route on a basis of the acquired layout information, the route being a route along which the mobile apparatus is capable of moving to any one member of each of the plurality of groups.

8. The mobile apparatus according to claim 7, wherein the processor sets the route in such a manner that a total length of the route is shorter than other candidates.

9. The mobile apparatus according to claim 7, wherein, when the plurality of groups comprise a plurality of groups, the processor sets the route in such a manner that the route leads first to any one member of a group having a largest number of members.

10. The mobile apparatus according to claim 7, wherein, when the plurality of groups comprise a plurality of groups, the processor sets the route in such a manner that the route leads last to any one member of a group having a smallest number of members.

11. The mobile apparatus according to claim 1, wherein the distribution material is held in a state in which the distribution material is sorted separately for the plurality of groups.

12. The mobile apparatus according to claim 11, wherein the distribution material is sorted in accordance with an order of moves to the plurality of groups.

13. The mobile apparatus according to claim 1, wherein the processor is further configured to:
control the mobile apparatus to print printed matter as the distribution material.

14. The mobile apparatus according to claim 13, wherein, until reception of the printed matter in each of the plurality of groups is detected, the processor does not control the mobile apparatus to start printing the printed matter which is to be distributed to a next move destination.

15. The mobile apparatus according to claim 13, wherein, until a move to a next move destination is started, the processor does not control the mobile apparatus to start printing the printed matter which is to be distributed to the next move destination.

16. The mobile apparatus according to claim 13, wherein the processor controls the mobile apparatus to print printed matter for each of the plurality of groups, the printed matter describing how to distribute the distribution material.

17. The mobile apparatus according to claim 1, wherein the processor is further configured to:
notify each of the plurality of groups of information about how to distribute the distribution material.

18. The mobile apparatus according to claim 17, further comprising:
a display that displays the information about how to distribute the distribution material.

19. The mobile apparatus according to claim 17, further comprising:
a speaker that notifies, through voice, the information about how to distribute the distribution material.

20. A distribution-material providing system comprising:
an instruction apparatus comprising a processor that gives an instruction to move to any one member of each of a plurality of groups, wherein each of the groups is set in such a manner that, when a plurality of members of the group are connected by using plurality of straight lines, all of the plurality of members are connected by plurality of straight lines, wherein a length of each of the plurality of straight liens is equal to or shorter than a predetermined threshold, and wherein each of the plurality of straight lines connects one member of the plurality of members and one other member of the plurality of members; and
a self-propelling mechanism that, in response to the instruction from the instruction apparatus, moves to the any one member of each of the plurality of groups and provides distribution material for the group to the any one member.

* * * * *